United States Patent
Shiina et al.

(10) Patent No.: US 12,063,066 B2
(45) Date of Patent: Aug. 13, 2024

(54) WIRELESS COMMUNICATION SYSTEM, BASE STATION CONTROL DEVICE, EVACUATION GUIDANCE METHOD, AND BASE STATION CONTROL PROGRAM

(71) Applicant: NIPPON TELEGRAPH AND TELEPHONE CORPORATION, Tokyo (JP)

(72) Inventors: Ryota Shiina, Musashino (JP);
Tomohiro Taniguchi, Musashino (JP);
Kazutaka Hara, Musashino (JP);
Shinya Tamaki, Musashino (JP);
Tomoki Murakami, Musashino (JP);
Toshiro Nakahira, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 138 days.

(21) Appl. No.: 17/915,889

(22) PCT Filed: Apr. 2, 2020

(86) PCT No.: PCT/JP2020/015148
§ 371 (c)(1),
(2) Date: Sep. 29, 2022

(87) PCT Pub. No.: WO2021/199394
PCT Pub. Date: Oct. 7, 2021

(65) Prior Publication Data
US 2023/0136032 A1    May 4, 2023

(51) Int. Cl.
*H04B 10/00* (2013.01)
*H04B 10/11* (2013.01)
(Continued)

(52) U.S. Cl.
CPC ............ *H04B 10/11* (2013.01); *H04W 76/10* (2018.02)

(58) Field of Classification Search
CPC ... H04B 10/11; H04B 10/112; H04B 10/1129; H04B 10/114; H04B 10/1149; H04B 10/116; H04B 10/25752; H04B 10/25753
See application file for complete search history.

(56) References Cited

U.S. PATENT DOCUMENTS

| | | | |
|---|---|---|---|
| 2014/0105606 A1* | 4/2014 | Vaananen | H04W 16/18 398/117 |
| 2018/0139202 A1* | 5/2018 | Sethi | H04W 84/12 |
| 2019/0028193 A1* | 1/2019 | Miras | H04B 10/1149 |

FOREIGN PATENT DOCUMENTS

WO    WO-2021024441 A1    2/2021

OTHER PUBLICATIONS

Tomoaki Shikakura et al., Research on the Perception of Lighting Fluctuation in a Luminous Offices Environment, Journal of the Illuminating Engineering Institute of Japan, vol. 85, No. 5, 2001, pp. 346-351.

* cited by examiner

*Primary Examiner* — Daniel G Dobson
(74) *Attorney, Agent, or Firm* — Harness, Dickey & Pierce, P.L.C.

(57) ABSTRACT

An object of the present disclosure is to make already installed smart lightings available as optical base stations as they are without modifying them, and perform connection/authentication control for RF communication using an optical signal sent out from the optical base stations.

The present disclosure is a wireless communication system including: one or more wireless base stations that wirelessly communicate with a terminal; a base station control device that collects wireless base station information from each (Continued)

wireless base station, determines a wireless base station that wirelessly communicates with the terminal using the collected wireless base station information, and transmits an optical ID corresponding to the determined wireless base station; and one or more optical base stations that receive the optical ID from the base station control device, and transmit the received optical ID to the terminal using an optical signal, wherein the wireless base station determined by the base station control device wirelessly communicates with the terminal that receives the optical ID.

5 Claims, 35 Drawing Sheets

(51) Int. Cl.
*H04W 76/10* (2018.01)
*H04J 14/00* (2006.01)

Fig. 2

[2] OPTICAL ID CORRESPONDENCE LIST

| SERIAL NUMBER | OPTICAL ID | CONNECTION INFORMATION FOR WIRELESS COMMUNICATION | | | AUTHENTICATION INFORMATION FOR WIRELESS COMMUNICATION | | | PRIORITY |
|---|---|---|---|---|---|---|---|---|
| | | WIRELESS SCHEME | FREQUENCY BAND | RADIO CHANNEL | SSID | PASSWORD | ID | |
| 1 | 1010 | 802.11n | 2.4GHz | 1 | abcd | ab11ab | 142b | 2 |
| 2 | 1000 | 802.11ac | 5GHz | 8 | a1b1 | ab22ab | 31s5 | 1 |
| 3 | 1100 | 802.11ac | 2.4GHz | 4 | c2d2 | cd11cd | spk8 | 3 |
| 4 | 1101 | 802.11b | 2.4GHz | 3 | a1b2 | cd22cd | 6ary | 4 |

WIRELESS BASE STATION INFORMATION

| WIRELESS PARAMETERS | WIRED PARAMETERS |
|---|---|
| WIRELESS SCHEME<br>802.11 a/n/ac/ax | WIRED INTERFACE<br>100MbE 1GbE 10GbE |
| FREQUENCY BAND<br>2.4GHz/5GHz | WIRED TRAFFIC ALIVE MONITORING RESULT |
| RADIO CHANNEL ch.#N | . . . |
| NUMBER OF CONNECTED TERMINALS | . . . |
| TRANSMISSION POWER [dBm] | . . . |
| RSSI [dBm] | . . . |
| Modulation Coding Scheme | . . . |
| NUMBER OF SPATIAL STREAMS | . . . |
| Channel state information | . . . |
| . . . | . . . |

Fig. 22

| ACCELERATION SENSOR INFORMATION $x,y,z$ (m/s²) | | | | GYRO SENSOR INFORMATION $x,y,z$ (rad/s) | MAGNETIC SENSOR INFORMATION $x,y,z$ (μT) | ... |
|---|---|---|---|---|---|---|
| $0 \leq x < 1$ or $0 \leq y < 1$ or $0 \leq z < 1$ | $1 \leq x < 3$ or $1 \leq y < 3$ or $1 \leq z < 3$ | $3 \leq x < 5$ or $3 \leq y < 5$ or $3 \leq z < 5$ | $5 \leq x$ or $5 \leq y$ or $5 \leq z$ | ... | ... | ... |
| SETTING VALUE FOR $\alpha$ : 0.2 | 0.4 | 0.7 | 0.9 | ... | ... | ... |

WIRELESS COMMUNICATION SYSTEM, BASE STATION CONTROL DEVICE, EVACUATION GUIDANCE METHOD, AND BASE STATION CONTROL PROGRAM

TECHNICAL FIELD

The present disclosure relates to a wireless communication system and a wireless communication method.

CROSS-REFERENCE TO RELATED APPLICATIONS

This application is a 371 U.S. National Phase of International Application No. PCT/JP2020/015148, filed on Apr. 2, 2020. The entire disclosure of the above application is incorporated herein by reference.

BACKGROUND ART

There has been proposed a technique that also uses optical wireless communication (downlink communication using LED lightings or the like) in an RF (radio frequency) communication system such as Wi-Fi (see, e.g., Patent Literature 1). In Patent Literature 1, downlink communication of data such as an SSID (service set identifier) and a password needed for connection authentication of Wi-Fi is performed by optical wireless. As a result, in Patent Literature 1, a user can connect to Wi-Fi only by entering the optical wireless communication area without performing connection/authentication work such as checking which wireless communication is usable and performing input operations of an SSID and a password.

There has been proposed a technique in which instead of transmitting connection/authentication information itself for RF communication by optical wireless communication, an optical ID having a small amount of data corresponding thereto is transmitted (see, e.g., Patent Literature 2). In Patent Literature 2, an optical transmitter transmits data of the above optical ID with a color/brightness change under the condition that humans cannot perceive it. Both a base station and a terminal have a correspondence list between the optical ID and the connection/authentication information, and the terminal extracts the connection/authentication information corresponding to the received optical ID, and performs RF communication in accordance with this information. As a result, in Patent Literature 2, in a system that performs connection/authentication control for RF communication using an optical signal, light sources that are used for both optical wireless communication and lighting can be used on the base station side and a terminal such as a normal smartphone can be used on the terminal side. In addition, it has merits in terms of popularization of facilities at the time of introducing the facilities and suppression of cost and power consumption.

In the system of Patent Literature 2, the main configuration is a configuration in which an optical base station (such as a smart lighting) and an RF base station are integrated. In this configuration, optical base stations are required depending on the number of RF base stations. Further, in the above configuration, it is difficult to utilize already installed optical base stations as they are. There is a need for a concrete mechanism for integrated management/control of already installed optical base stations and RF base stations.

CITATION LIST

Patent Literature

Patent Literature 1: US20180139202A1
Patent Literature 2: PCT/JP2019/031260

Non-Patent Literature

Non-Patent Literature 1: SHIKAKURA Tomoaki et al., "Research on the Perception of Lighting Fluctuation in a Luminous Offices Environment", Journal of Science and Technology in Lighting Vol. 85, No. 5, 2001, PP. 346-351

SUMMARY OF THE INVENTION

Technical Problem

An object of the present disclosure is to make already installed smart lightings available as optical base stations as they are without modifying them, and perform connection/authentication control for RF communication using an optical signal sent out from the optical base stations.

Means for Solving the Problem

The present disclosure has a configuration in which optical base stations and RF base stations are separated from each other in an optical/RF wireless hybrid communication system, and controls one or more optical base stations to connect an RF base station and a terminal based on information acquired from the RF base stations.

Specifically, a wireless communication system according to the present disclosure includes:
  one or more wireless base stations that wirelessly communicate with a terminal;
  a base station control device that collects wireless base station information from each wireless base station, determines a wireless base station that wirelessly communicates with the terminal using the collected wireless base station information, and transmits an optical ID corresponding to the determined wireless base station; and
  one or more optical base stations that receive the optical ID from the base station control device, and transmit the received optical ID to the terminal using an optical signal,
  wherein the wireless base station determined by the base station control device wirelessly communicates with the terminal that receives the optical ID.

Specifically, a wireless communication method according to the present disclosure is
  a wireless communication method executed by a wireless communication system in which one or more wireless base stations and one or more optical base stations are connected to a base station control device,
  wherein the base station control device
  collects wireless base station information from each wireless base station,
  determines a wireless base station that wirelessly communicates with a terminal using the collected wireless base station information, and
  transmits an optical ID corresponding to the determined wireless base station to at least one of the one or more optical base stations, the optical base station that receives the optical ID transmits the received optical ID to the terminal using an optical signal, and the wireless base station determined by the base station control device wirelessly communicates with the terminal that receives the optical ID.

Specifically, a base station control device according to the present disclosure is a base station control device connected to one or more wireless base stations and one or more optical base stations, wherein the base station control device collects wireless base station information from each wireless base station, determines a wireless base station that wirelessly communicates with a terminal using the collected wireless base station information, transmits an optical ID corresponding to the determined wireless base station to at least one of the one or more optical base stations, causes the optical base station to transmit the optical ID to the terminal using an optical signal, and causes the determined wireless base station to wirelessly communicate with the terminal that receives the optical ID.

Specifically, a base station control program according to the present disclosure is a program for causing a computer to implement each functional unit provided in the base station control device according to the present disclosure, and is a program for causing a computer to execute each step provided in the wireless communication method according to the present disclosure.

Effects of the Invention

It is possible to make already installed smart lightings available as optical base stations as they are without modifying them, and perform connection/authentication control for RF communication using an optical signal sent out from the optical base stations.

BRIEF DESCRIPTION OF DRAWINGS

FIG. 2 shows an example of an optical ID correspondence list.

FIG. 3 shows an example of wireless base station information.

FIG. 22 is a diagram illustrating processing in the calculation unit of the terminal according to the sixth embodiment.

DESCRIPTION OF EMBODIMENTS

Figure 1:
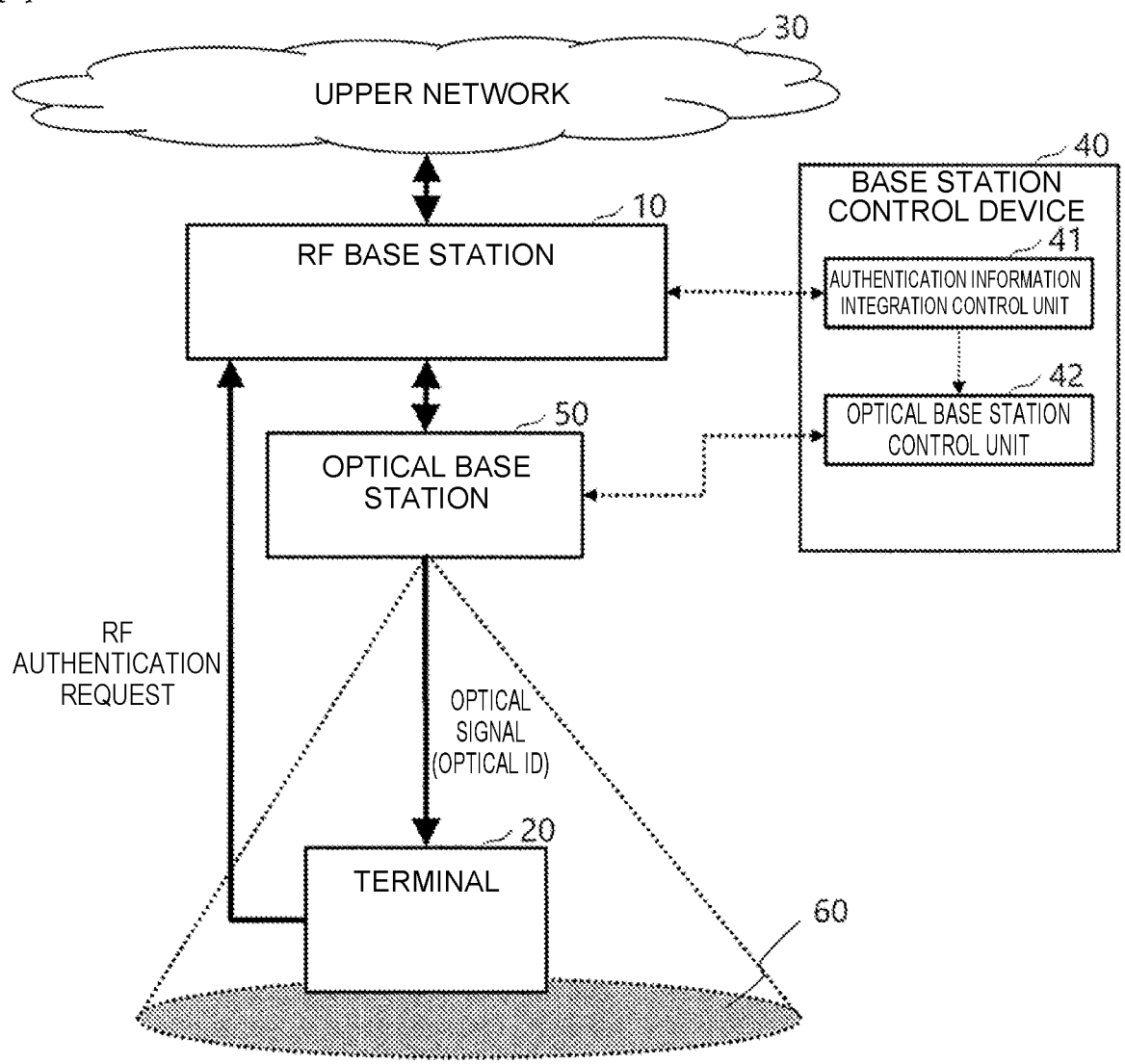
FIG. 1 shows a basic configuration of a system according to the present disclosure.

Hereinafter, embodiments of the present disclosure will be described in detail with reference to the drawings. Note that the present disclosure is not limited to the embodiments shown below. These examples of embodiment are merely illustrative, and the present disclosure can be embodied with various modifications and improvements based on the knowledge of those skilled in the art. Note that in the present specification and the drawings, components having the same reference numeral shall refer to the same component.

SUMMARY OF THE PRESENT DISCLOSURE

The main configuration is a configuration in which optical base stations and RF base stations are separated from each other, and the already installed optical base stations are flexibly controlled based on some information aggregated from the RF base stations.

By providing a base station control device in a network composed of the optical base stations and the RF base stations, information aggregation from the RF base stations and management/control of the optical base stations are executed integrally.

A control scheme is proposed in executing information aggregation from the RF base stations and control of the optical base stations.

First Embodiment

FIG. 1 shows a basic configuration of a system according to the present disclosure. The system according to the present disclosure includes a base station control device 40, a single RF base station 10, and a single optical base station 50. The RF base station 10 and the optical base station 50 are connected to each other. The RF base station 10 is connected to an upper network 30. Their connection form may be any form, and may be wired connection or wireless connection.

The base station control device 40 is a device that externally controls the optical base station 50, and includes an authentication information integration control unit 41, an optical base station control unit 42, and an optical ID correspondence list. The base station control device 40 of the present disclosure can also be implemented by a computer and a program, and the program can be recorded on a recording medium or provided through a network.

FIG. 2 shows an example of the optical ID correspondence list. FIG. 2 shows an example of four optical IDs with serial numbers of 1 to 4. Connection information for wireless communication is information that defines which wireless scheme, which frequency band, and which radio channel are used for RF wireless communication between the RF base station 10 and the terminal 20. Authentication information for wireless communication is information that defines an SSID (service set identifier), a password, and an ID (identifier) when the terminal 20 access the RF base station 10. The authentication information may be one of them, or any two or more may be defined. The connection information for wireless communication and the authentication information for wireless communication are examples, and other necessary information may be defined.

The authentication information integration control unit 41 collects wireless base station information from the RF base station 10, selects an RF base station 10 to which the terminal 20 should connect, and transmits information to the optical base station control unit 42.

FIG. 3 shows an example of wireless base station information. The wireless base station information includes wireless parameters and wired parameters. The wireless parameters are parameters used in performing wireless communication with the terminal 20, such as a wireless scheme, a frequency band, a radio channel, the number of connected terminals, transmission power, RSSI (received signal strength indicator), a modulation coding scheme, the number of spatial streams, and channel state information. The wired parameters are, for example, a wired interface, and a wired traffic alive monitoring result.

The authentication information integration control unit 41 selects the optimum RF base station 10 to which the terminal 20 should connect using the collected wireless base station information, and transmits connection information and authentication information to be used in the RF base station 10 to the optical base station control unit 42.

The optical base station control unit 42 extracts an optical ID, which corresponds to the connection information and authentication information received from the authentication information integration control unit 41, from the optical ID correspondence list, and transmits optical base station control information indicating transmission of the extracted optical ID to the optical base station 50. The optical base station control information includes the connection information and authentication information for the RF base station 10 to which the terminal 20 should connect. The optical ID included in the optical base station control information may be the optical ID itself, or may be a signal pattern corresponding to the optical ID. The signal pattern includes a bit pattern of 8 bits, 16 bits, etc. By lengthening the bit pattern, the reception accuracy at the terminal 20 can be improved.

The optical base station 50 transmits the optical ID, which is in accordance with the optical base station control information from the base station control device 40, to the terminal 20 using an optical signal. Any equipment capable of transmitting the optical ID to the terminal 20 can used as the optical base station 50, for example, non-communication equipment that is not originally used for communication, such as a smart lighting may be used. An optical signal transmitted from the optical base station 50 may be modulated by an orthogonal code or the like so that the reception accuracy at the terminal 20 may be improved.

The terminal 20 holds the same optical ID correspondence list as the base station control device 40. When the terminal 20 receives the optical ID, it refers to the optical ID correspondence list, and uses the connection information and authentication information for RF transmission/reception corresponding to the received optical ID to transmit an authentication request to an appropriate RF base station 10. This enables communication connection between the RF base station 10 and the terminal 20.

Note that the terminal 20 may not hold the same optical ID correspondence list as the base station control device 40. For example, the terminal 20 automatically acquires position information from within the terminal 20 when starting an application, and acquires the optical ID correspondence list corresponding to the position information using the application. Further, the terminal 20 may acquire an appropriate optical ID correspondence list according to the corresponding position information from the cloud via mobile communication.

Second Embodiment

Figure 4:
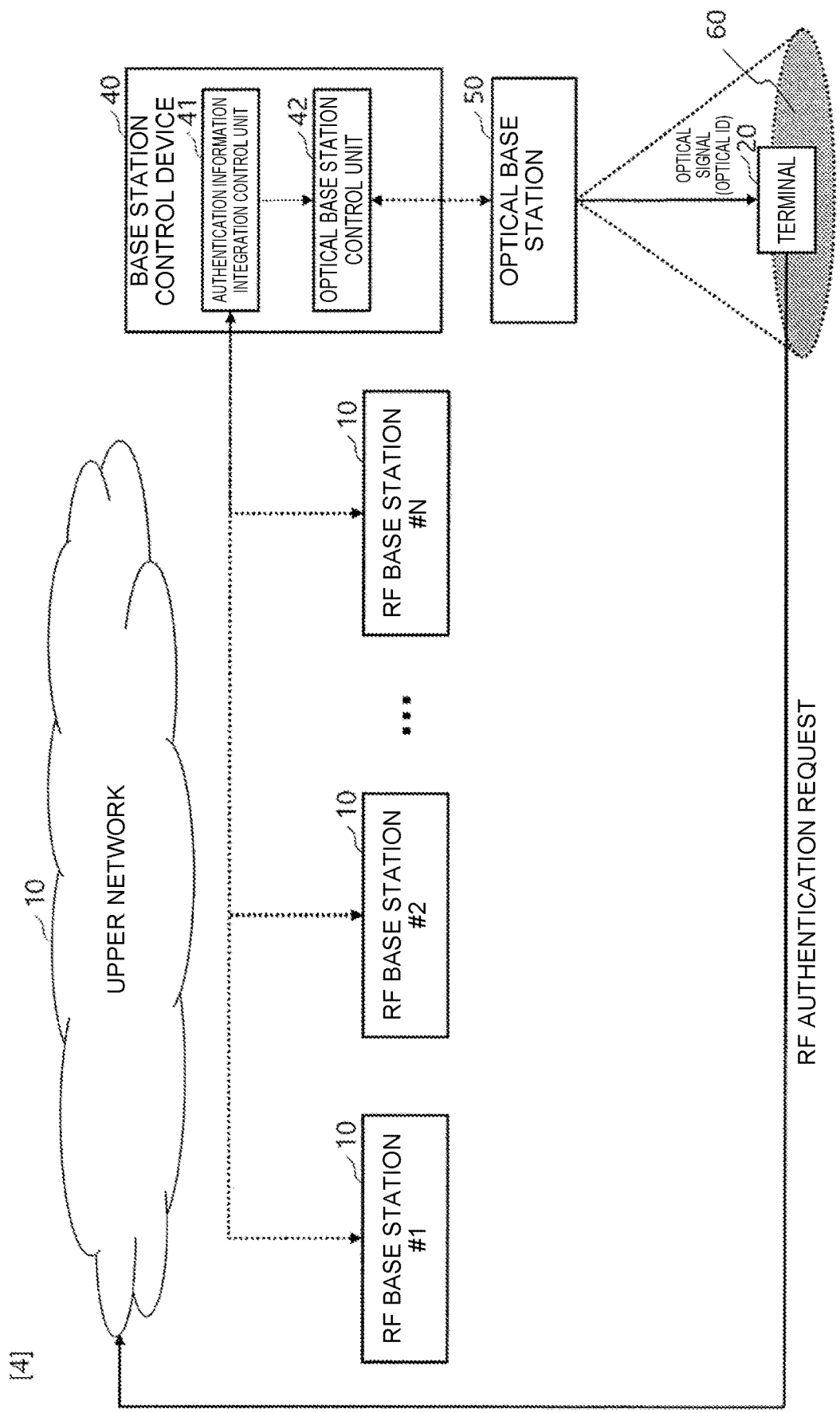
FIG. 4 shows an example of a configuration of a system according to a second embodiment.

FIG. 4 shows an example of a configuration of a system according to this embodiment. The system according to this embodiment includes the base station control device 40, a plurality of RF base stations 10, and a single optical base station 50. The base station control device 40 is a device that externally controls the optical base station 50, and includes the authentication information integration control unit 41 and the optical base station control unit 42.

The authentication information integration control unit 41 collects wireless base station information from each RF base station 10, selects the optimum RF base station 10 to which the terminal 20 should connect, and transmits information to the optical base station control unit 42. The optical base station control unit 42 transmits control information to the optical base station 50.

The optimum RF base station 10 selected in the authentication information integration control unit 41 is determined, for example, as follows:

The RF base station 10 having the highest expected communication band is preferentially connected to the terminal 20.

When there are a plurality of optical base stations 50, an RF base station 10 is selected so that the number of terminals 20 connected to each RF base station 10 is uniform.

Figure 5:
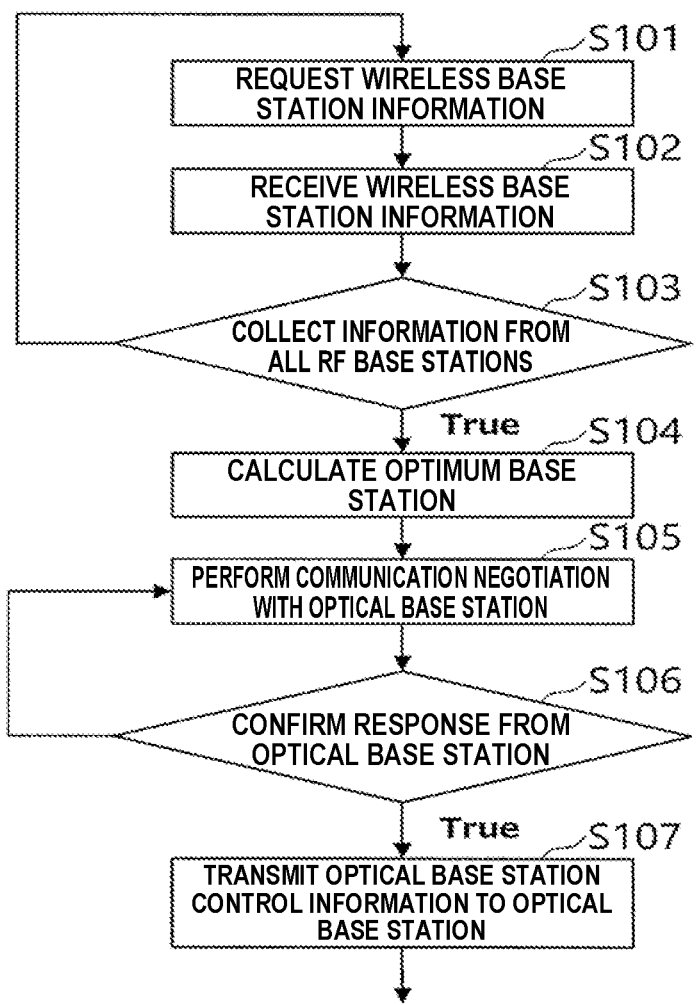
FIG. 5 shows an example of a processing flow in the case where an optical base station broadcasts an optical ID regardless of the presence or absence of a terminal.
Figure 6:
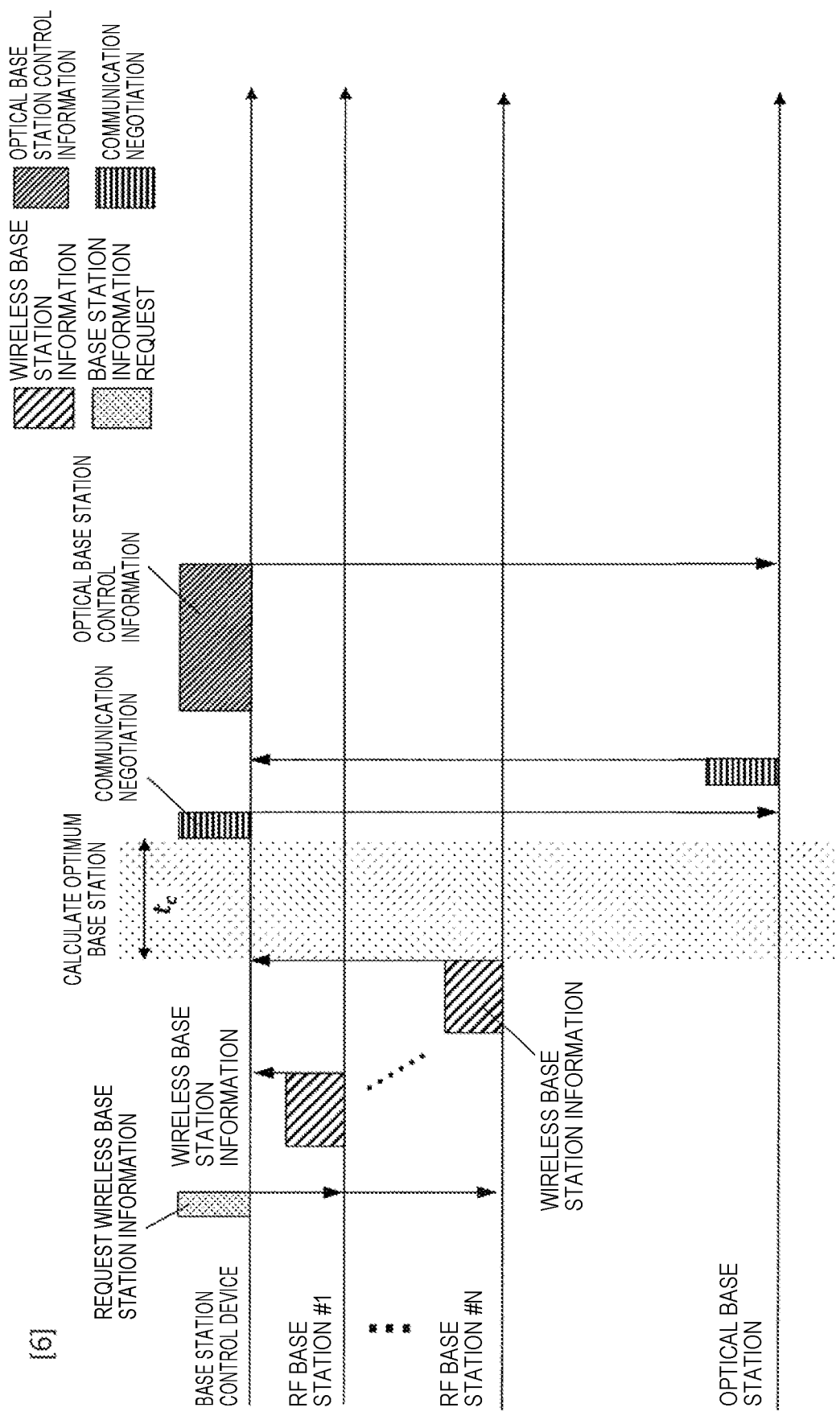
FIG. 6 shows an example of a control signal flow in the second embodiment.

FIG. 5 shows an example of a processing flow in the case where the optical base station 50 broadcasts the optical ID regardless of the presence or absence of a terminal. FIG. 6 shows an example of a control signal flow.

Step S101: The authentication information integration control unit 41 transmits a request for wireless base station information to each RF base station 10.

Step S102: The authentication information integration control unit 41 receives the wireless base station information from each RF base station 10.

Step S103: The authentication information integration control unit 41 determines whether or not the wireless base station information has been received from all the RF base stations 10.

Step S104: When having received the wireless base station information from all the RF base stations 10 (Yes in S103), the authentication information integration control unit 41 selects the optimum RF base station 10 from among the plurality of RF base stations 10.

Step S105 and S106: The optical base station control unit 42 performs communication negotiation with the optical base station 50 in order to confirm whether the optical base station control information can be transmitted. For example, the optical base station control unit 42 transmits a packet for survival confirmation to the optical base station 50 (S105), and confirms whether a response has been received from the optical base station 50 (S106).

Step S107: The optical base station control unit 42 transmits the optical base station control information to an optical base station 50 from which a response has been received from the optical base station 50.

Figure 7:
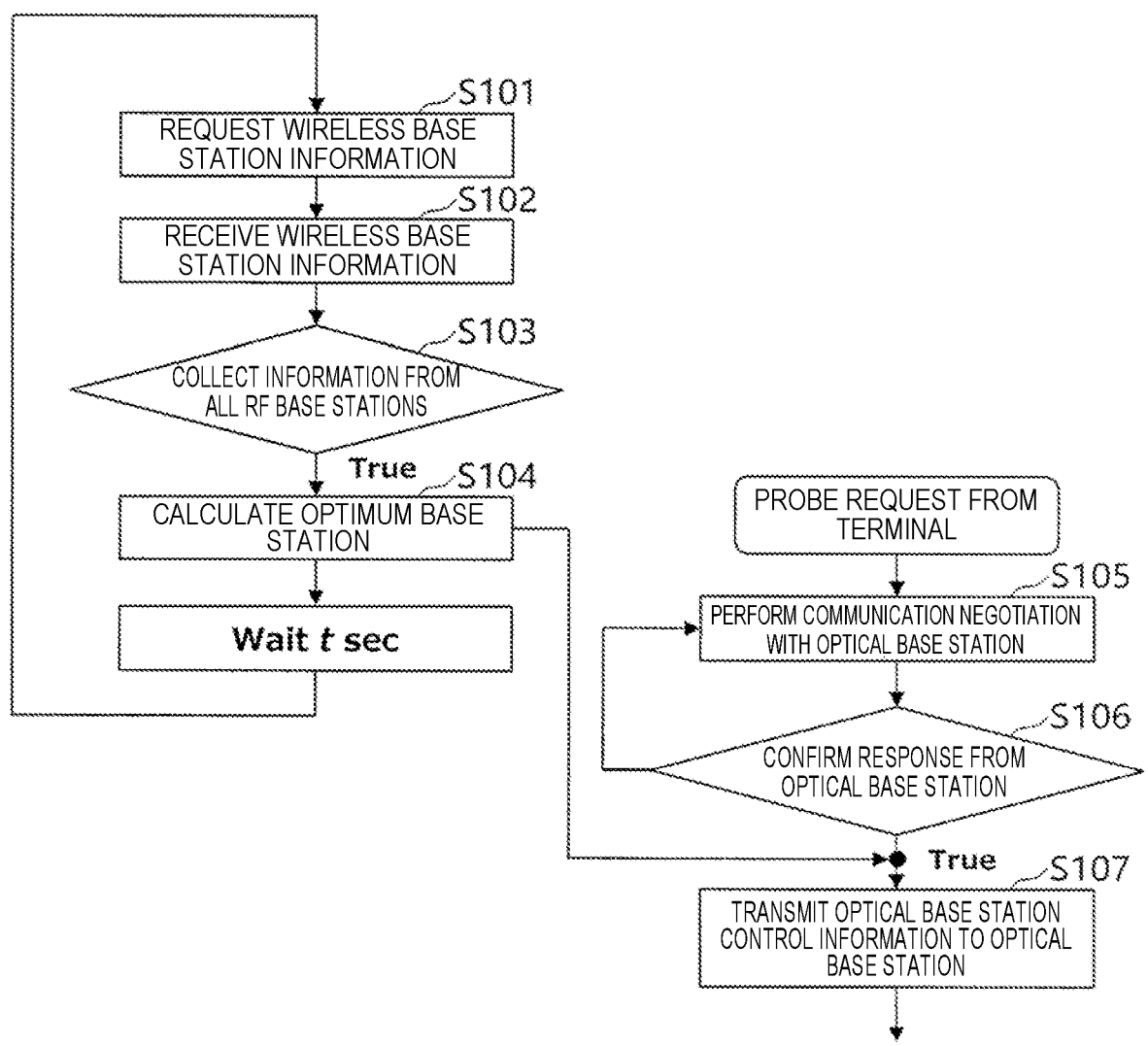
FIG. 7 shows an example of a processing flow in the case where a probe request from the terminal is used as the starting point of the flow processing.

The optical base station control information may be transmitted to the optical base station 50 with a probe request from the terminal 20 as a trigger. FIG. 7 shows an example of a processing flow in the case where a probe request from the terminal is used as the starting point of the flow processing. FIG. 6 shows an example of a control signal flow. In this case, the base station control device 40 selects the optimum RF base station 10 in advance (S104), and then executes steps S105 to S107 in response to receiving the probe request transmitted from the terminal 20.

Further, a function as an RF base station may be provided in the base station control device 40. For example, the base station control device 40 itself may function as a base station #N+1.

Third Embodiment

Figure 8:
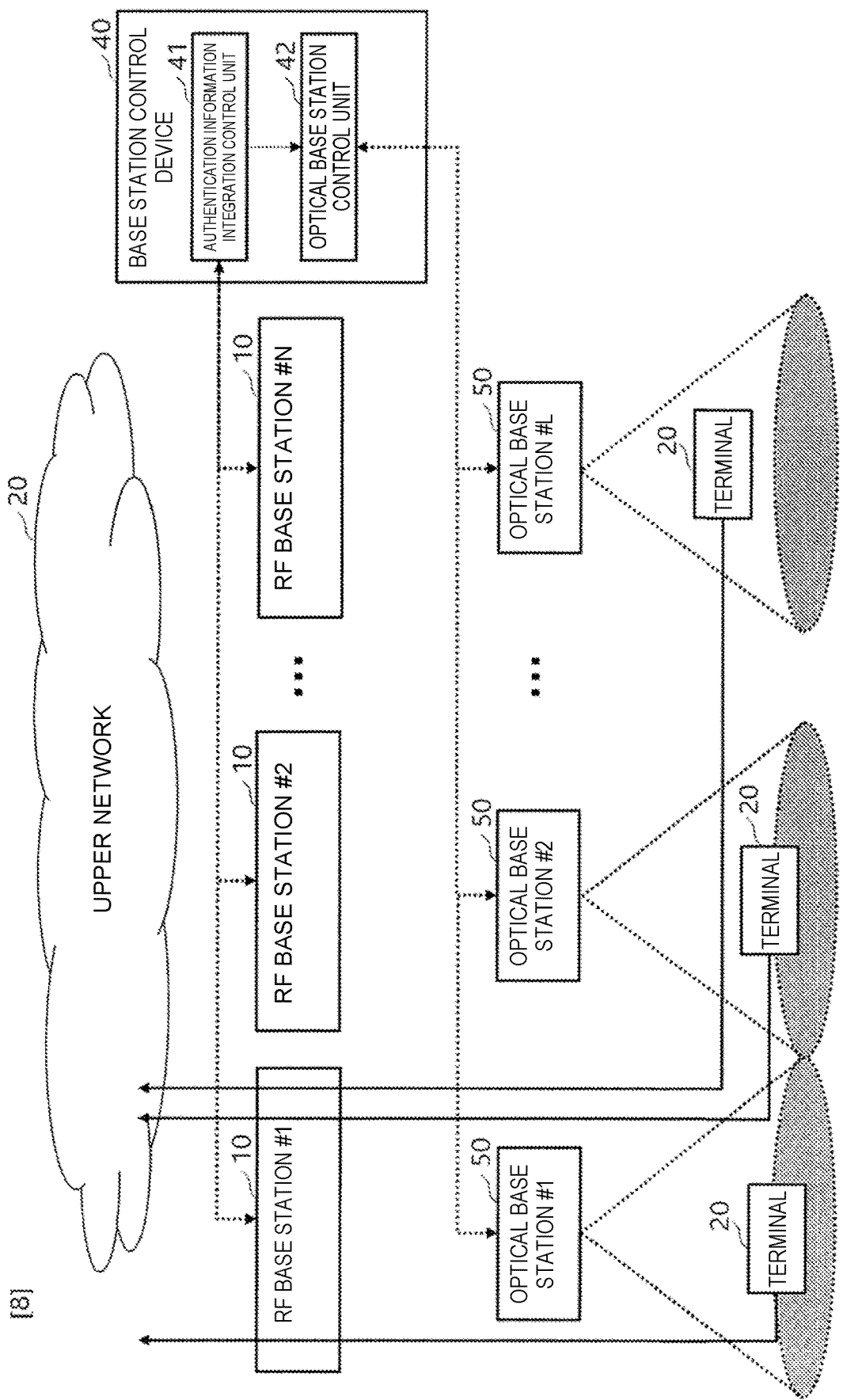
FIG. 8 shows an example of a configuration of a system according to a third embodiment.

FIG. 8 shows an example of a configuration of a system according to this embodiment. The system according to this embodiment includes a plurality of RF base stations 10 and a plurality of optical base stations 50. In this embodiment, the plurality of optical base stations 50 perform the same operation.

Figure 9:
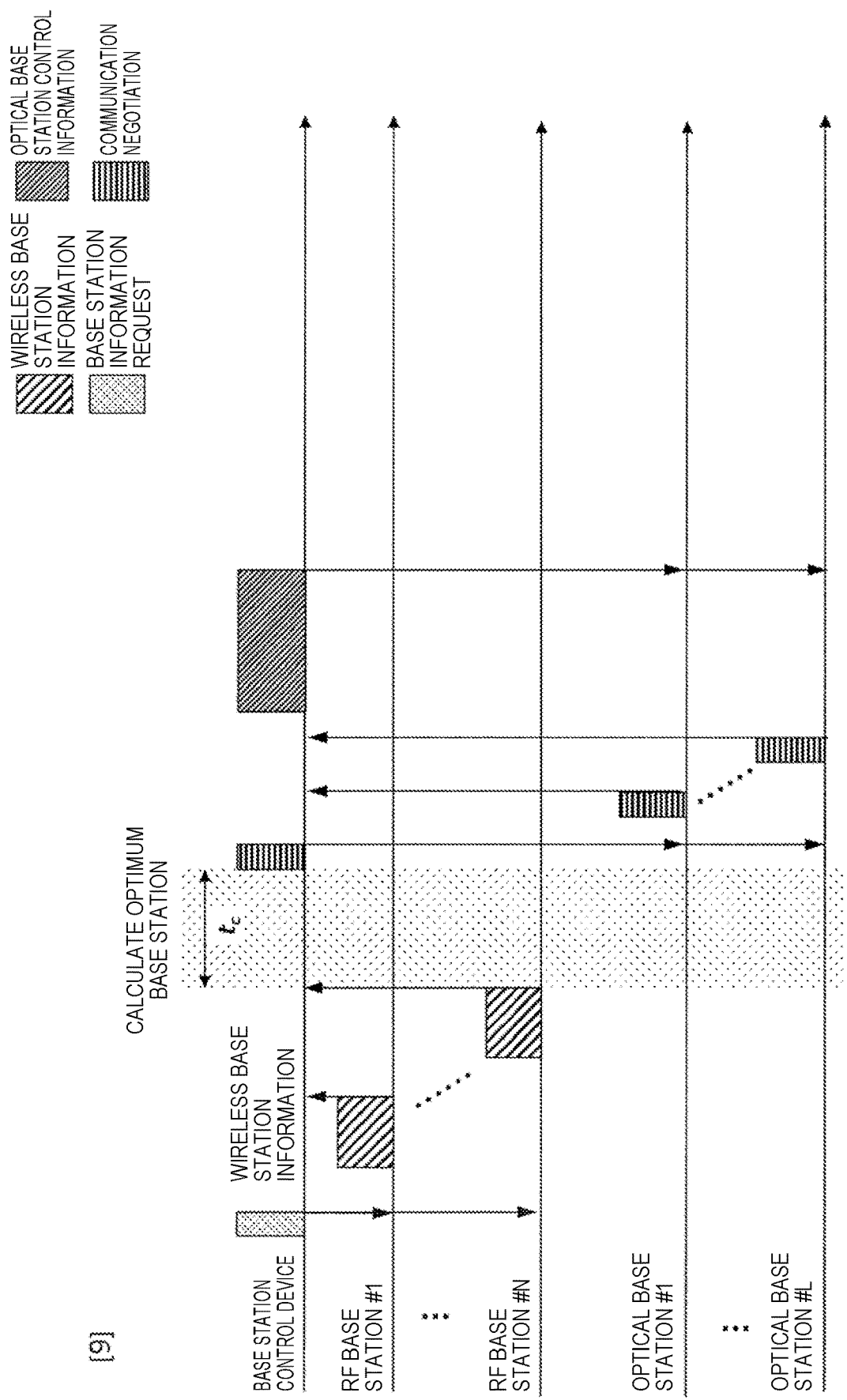
FIG. 9 shows an example of a control signal flow in the third embodiment.

FIG. 5 shows an example of a processing flow in the case where the optical base stations 50 broadcast the optical ID regardless of the presence or absence of terminals. FIG. 9 shows an example of a control signal flow. In this embodiment, in step S105, the optical base station control unit 42 performs communication negotiation with each optical base station 50. Then, if the optical base station control unit 42 can confirm responses from all the optical base stations 50 (True in S106), it transmits the optical base station control information to each optical base station 50 (S107). Here, the optical base station control information transmitted in step S107 is common to each optical base station 50.

The optical base station control information may be transmitted to the optical base stations 50 with a probe request from the terminal 20 as a trigger. FIG. 7 shows an example of a processing flow in the case where a probe request from the terminal is used as the starting point of the flow processing. FIG. 9 shows an example of a control signal flow. In this case, the base station control device 40 selects the optimum RF base station 10 in advance (S104), and then executes steps S105 to S107 in response to receiving the probe request transmitted from the terminal 20.

Further, a function as an RF base station may be provided in the base station control device 40. For example, the base station control device 40 itself may function as a base station #N+1.

Fourth Embodiment

Figure 10:
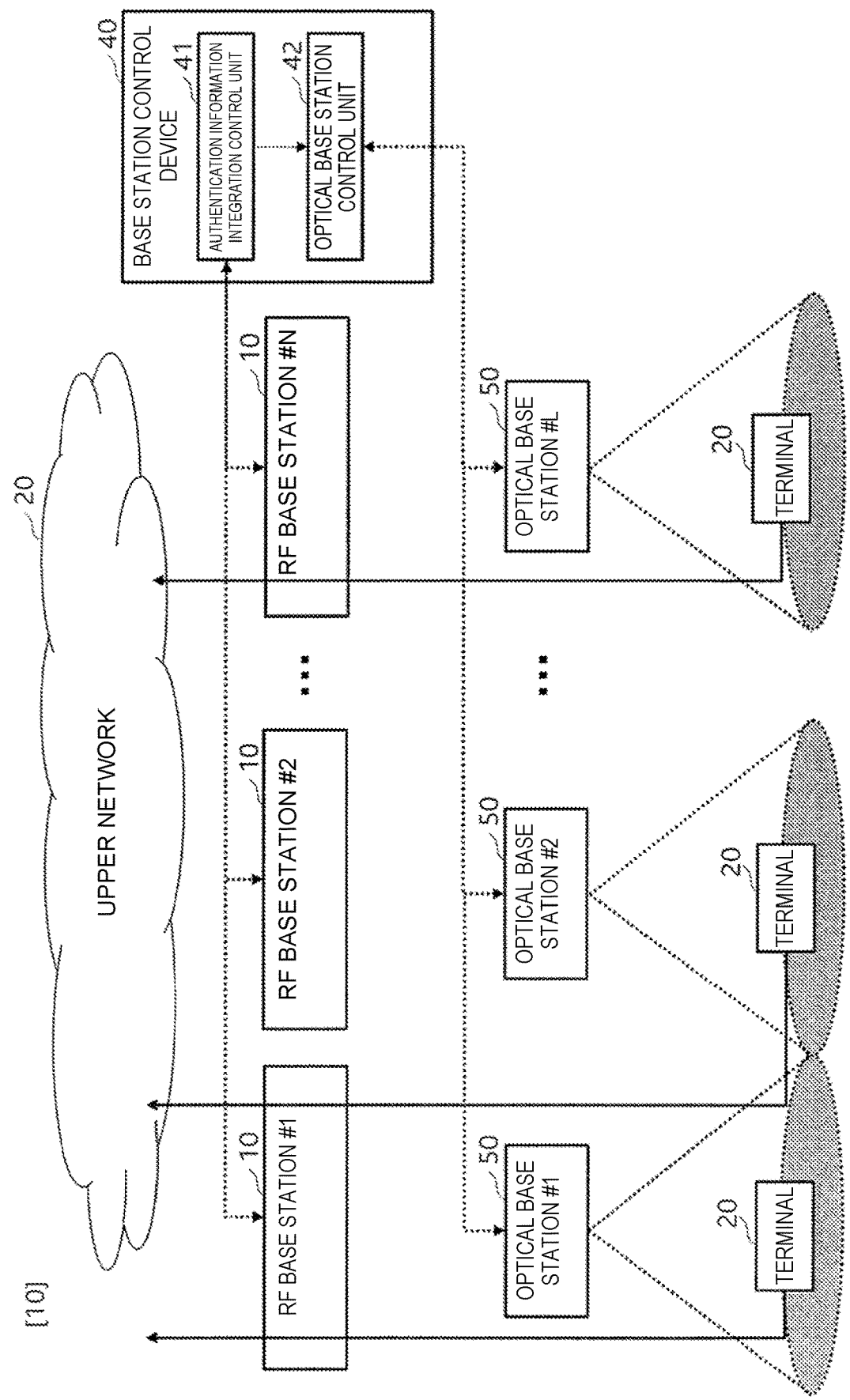
FIG. 10 shows an example of a configuration of a system according to a fourth embodiment.

FIG. 10 shows an example of a configuration of a system according to this embodiment. The system according to this embodiment includes a plurality of RF base stations 10 and a plurality of optical base stations 50. In this embodiment, the plurality of optical base stations 50 perform operation individually.

Figure 11:
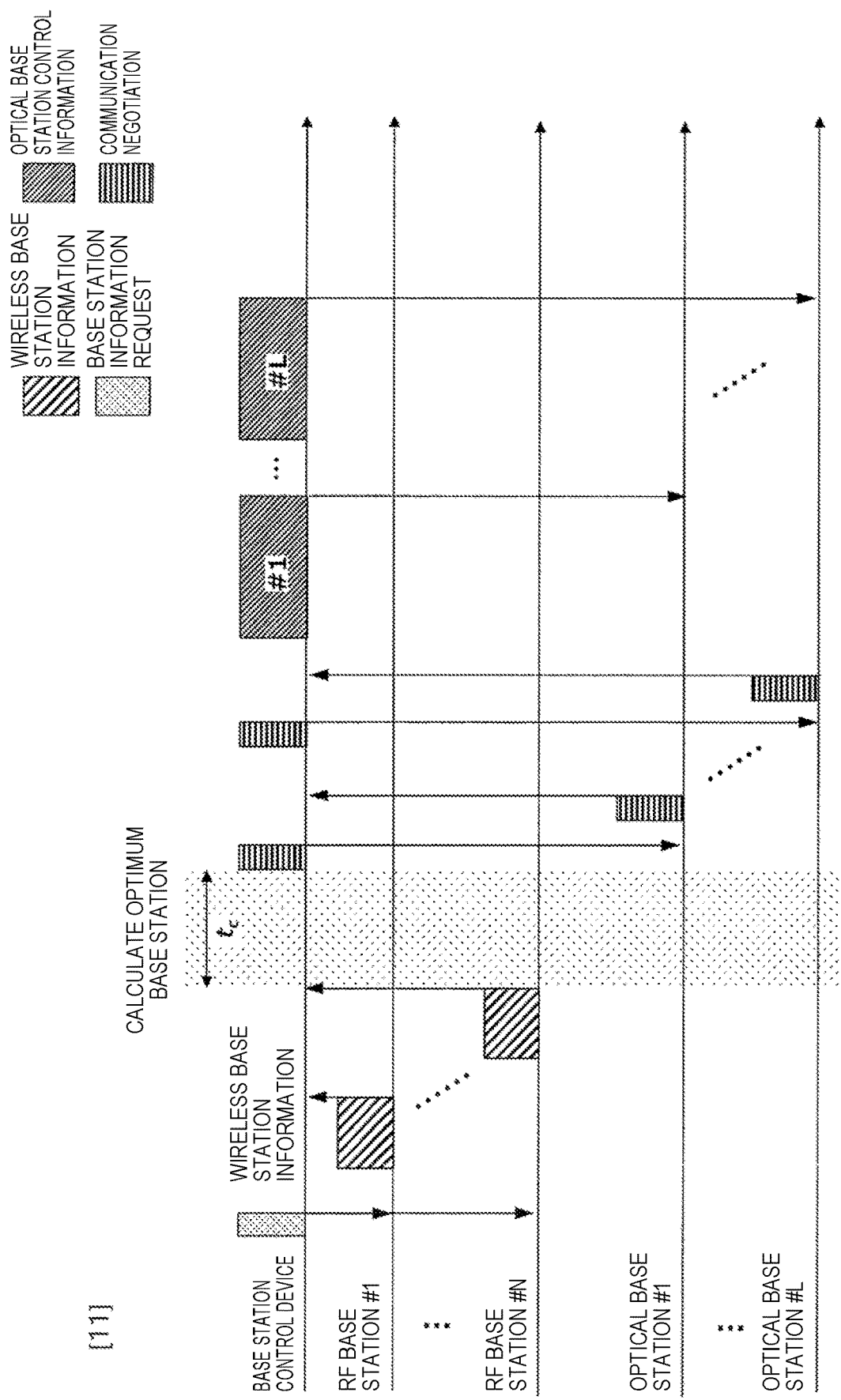
FIG. 11 shows an example of a control signal flow in the fourth embodiment.

FIG. 5 shows an example of a processing flow in the case where the optical base stations 50 broadcast the optical IDs regardless of the presence or absence of terminals. FIG. 11 shows an example of a control signal flow. In this embodiment, in step S105, the optical base station control unit 42 performs communication negotiation with each optical base station 50. At this time, the optical base station control unit 42 performs communication negotiation for each optical base station 50. As a result, in this embodiment, the plurality of optical base stations 50 can perform operation individually. Then, if the optical base station control unit 42 can confirm responses from all the optical base stations 50 (True in S106), it transmits individual optical base station control information to each optical base station 50 (S107).

The optical base station control information may be transmitted to the optical base stations 50 with a probe request from the terminal 20 as a trigger. FIG. 7 shows an example of a processing flow in the case where a probe request from the terminal is used as the starting point of the flow processing. FIG. 11 shows an example of a control signal flow. In this case, the base station control device 40 selects the optimum RF base station 10 in advance (S104), and then executes steps S105 to S107 in response to receiving the probe request transmitted from the terminal 20.

Further, a function as an RF base station may be provided in the base station control device 40. For example, the base station control device 40 itself may function as a base station #N+1.

Fifth Embodiment

In this embodiment, the position of the terminal 20 is grasped, and the optical base stations 50 each distribute an individual optical ID according to the position of the terminal 20. The system configuration of this embodiment is the same as that of the fourth embodiment.

Figure 12:
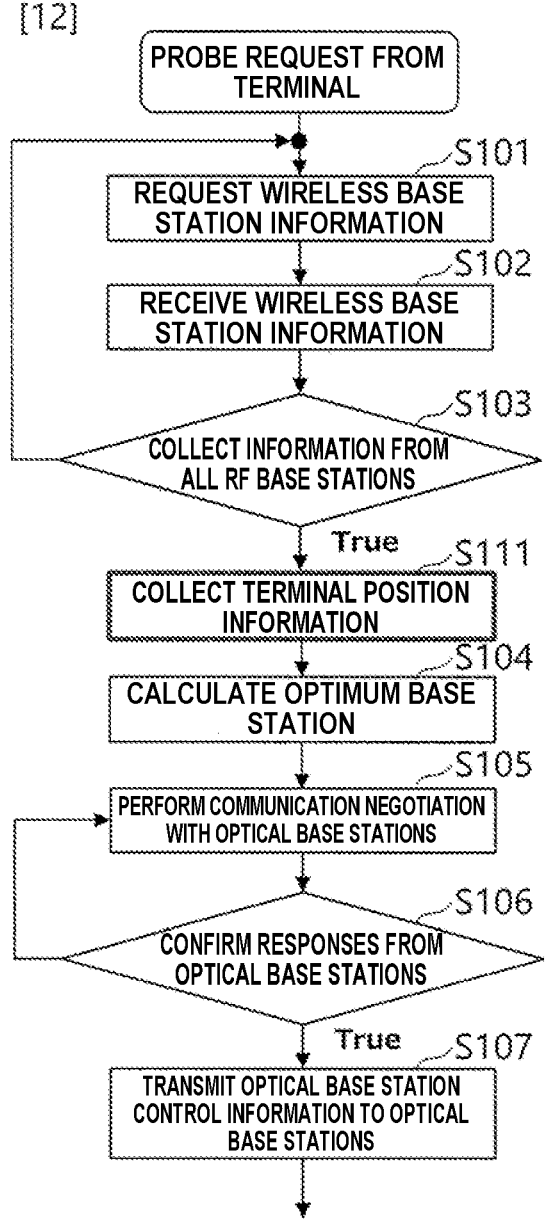
FIG. 12 shows an example of a processing flow in a fifth embodiment.
Figure 13:
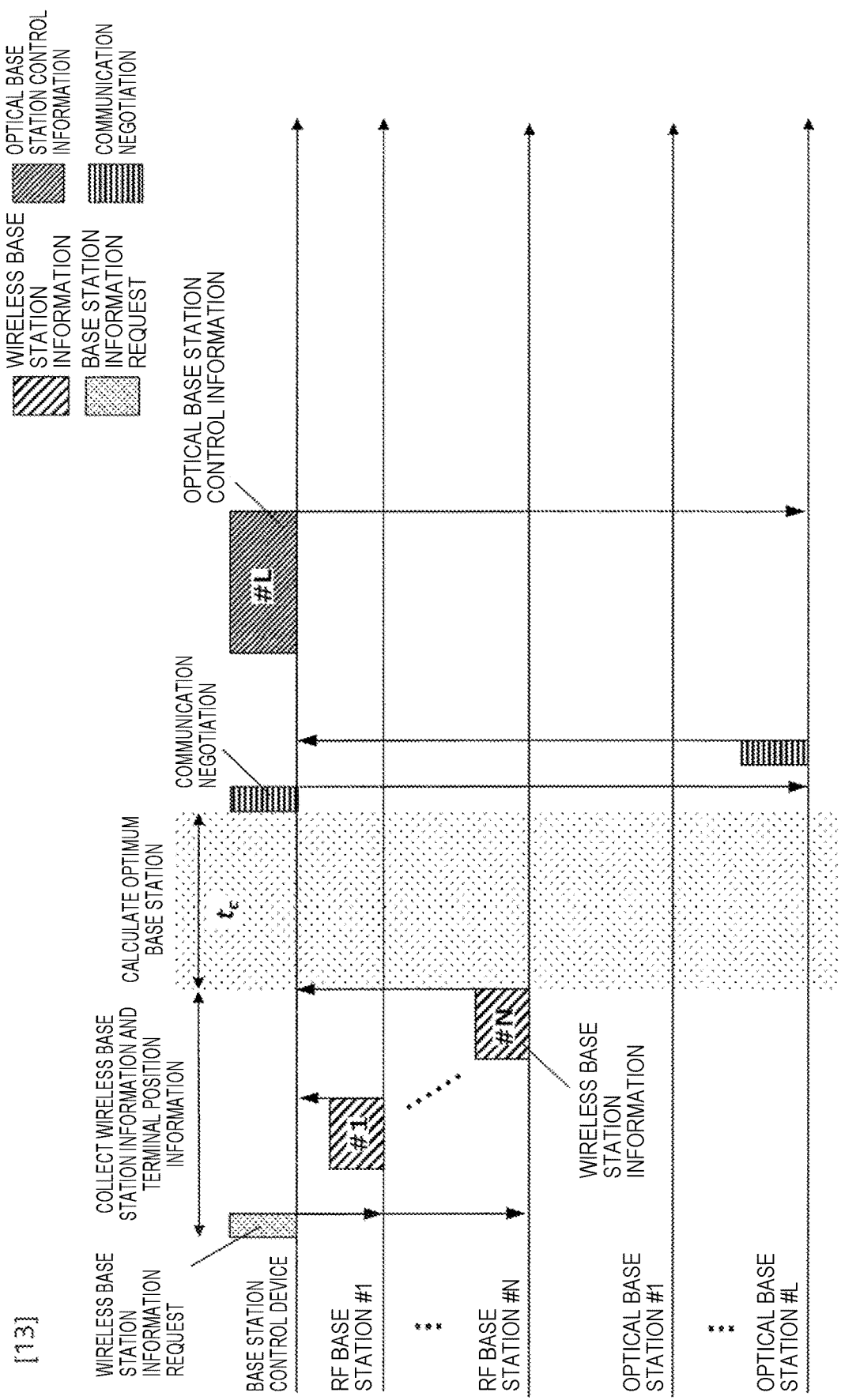
FIG. 13 shows an example of a control signal flow in the fifth embodiment.

FIG. 12 shows an example of a processing flow of the base station control device 40. FIG. 13 shows an example of a control signal flow. In this embodiment, when having received the wireless base station information from all the RF base stations 10 (Yes in S103), the optical base station control unit 42 executes step S111 before step S104. In step S111, the optical base station control unit 42 collects position information of the terminal 20. For example, the optical base station control unit 42 captures the terminal 20 or its user using a camera, and derives the position information of the terminal 20 using the position in the captured image. Further, it can be exemplified to estimate the terminal 20 using radio waves at the time of the probe request.

Then, in steps S105 and S106, the optical base station control unit 42 performs communication negotiation only with the optical base station 50 at a particular location (S105) and transmits the optical base station control information only to the optical base station 50 at the particular location (S107) based on the position information of the terminal 20.

Sixth Embodiment 1

This embodiment will describe a configuration for accurately acquiring information of the optical ID regardless of the position and light receiving angle of the terminal. The terminal according to this embodiment has a mechanism for periodically updating a threshold value setting and reading a change in light illuminance according to changes in its own position, light receiving angle, and the like.

Figure 14:
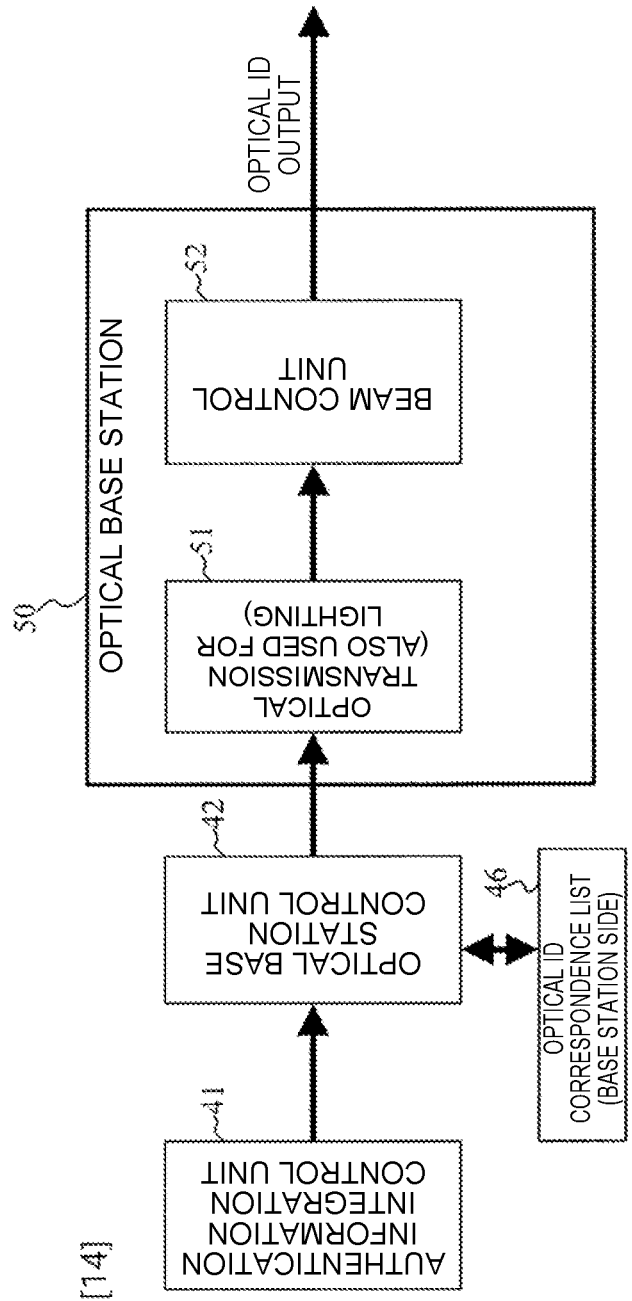
FIG. 14 is a diagram illustrating a configuration of an optical base station in a communication system according to a sixth embodiment.

FIG. 14 is a diagram illustrating a configuration of the optical base station 50. The optical base station 50 includes an optical transmitter 51 and a beam control unit 52. The same applies to the following embodiments.

The optical transmitter 51 uses a light source such as an LED that can be dimmed or toned. The light source may also be used for the purpose of lighting. The optical transmitter 51 converts the optical ID (modulated signal) from the optical base station control unit 42 into an optical signal having a predetermined wavelength, power, modulation scheme, or data rate. This embodiment will describe a case where the optical transmitter 51 sends out an optical signal (an optical signal modulated by the optical ID under the above conditions) so that the illuminance exceeds a certain level within a predetermined area 60.

The beam control unit 52 controls the beam shape so that the optical signal from the optical transmitter 51 can reach the predetermined area 60, and then sends out the optical signal into the space. If there are no obstacles that block the light, the optical signal reaches all the terminals 20 in the predetermined area 60.

Figure 15:
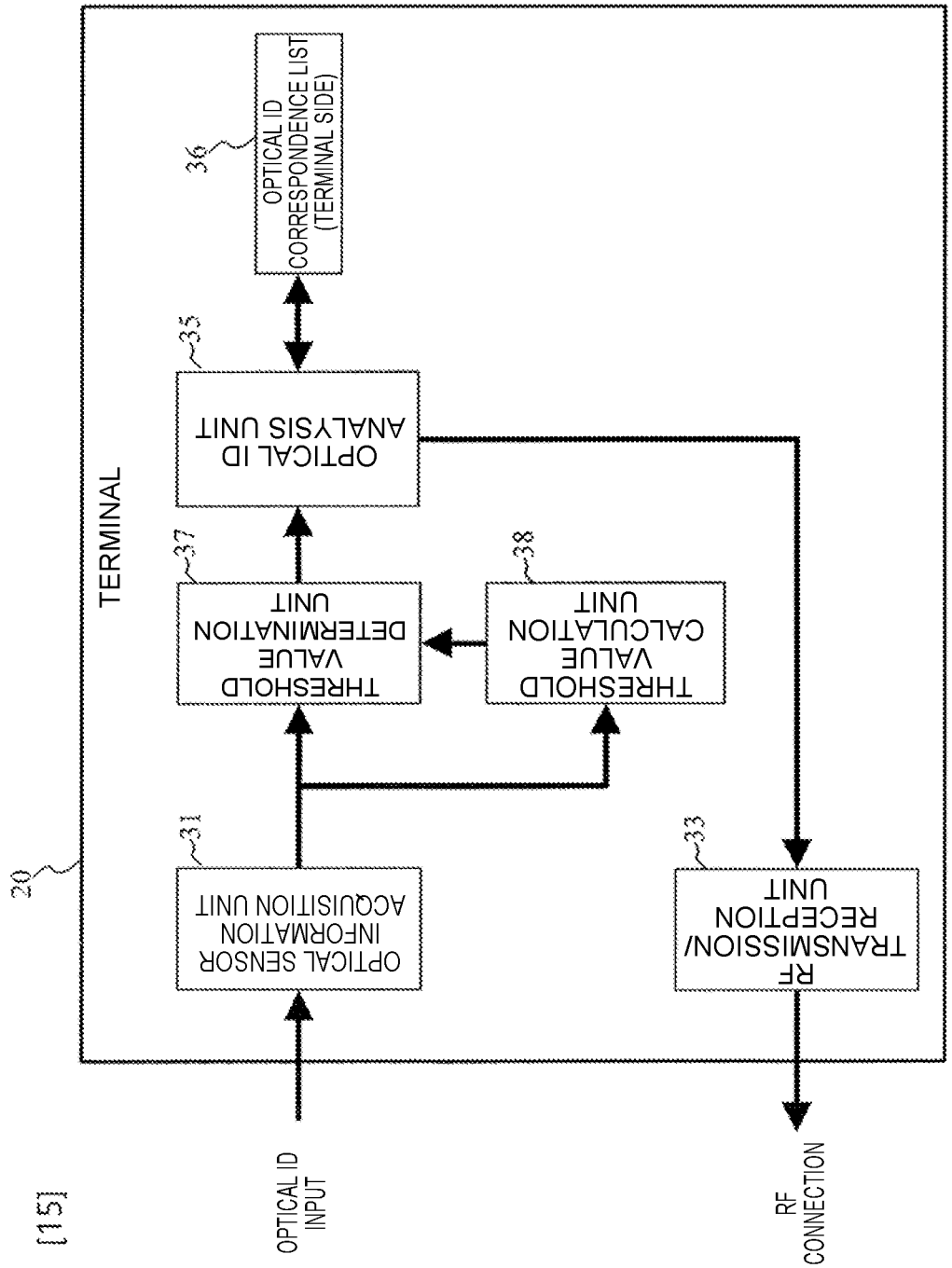
FIG. 15 is a diagram illustrating a configuration of a terminal in the communication system according to the sixth embodiment.

FIG. 15 is a diagram illustrating a configuration of the terminal 20. The terminal 20 includes:
- an optical sensor (optical sensor information acquisition unit 31) that receives an optical signal from the optical base station 50;
- a calculation unit (threshold value calculation unit 38) that samples illuminance of the optical signal to acquire a sampling value, and calculates a threshold value for performing binary conversion of the optical signal based on transition of the sampling value; and
- a determination unit (threshold value determination unit 37) that performs binary conversion of the optical signal based on the threshold value.

In addition, the terminal 20 further includes:
- a list (optical ID correspondence list 36) that describes correspondence between ID information and authentication information for starting RF wireless communication;
- an analysis unit (optical ID analysis unit 35) that refers to the list for the ID information obtained through binary conversion of the optical signal by the determination unit, and acquires the corresponding authentication information; and
- an RF transmission/reception unit 33 that transmits the authentication information acquired by the analysis unit to the RF base station 10 by RF wireless communication.

The optical sensor information acquisition unit 31 converts the optical signal from the optical transmitter 51 into an electrical signal to acquire it as a light illuminance value. The optical sensor information acquisition unit 31 is not limited to an optical receiver dedicated to optical wireless communication, and when the terminal 20 is a smartphone, the camera function may be used.

Figure 16:
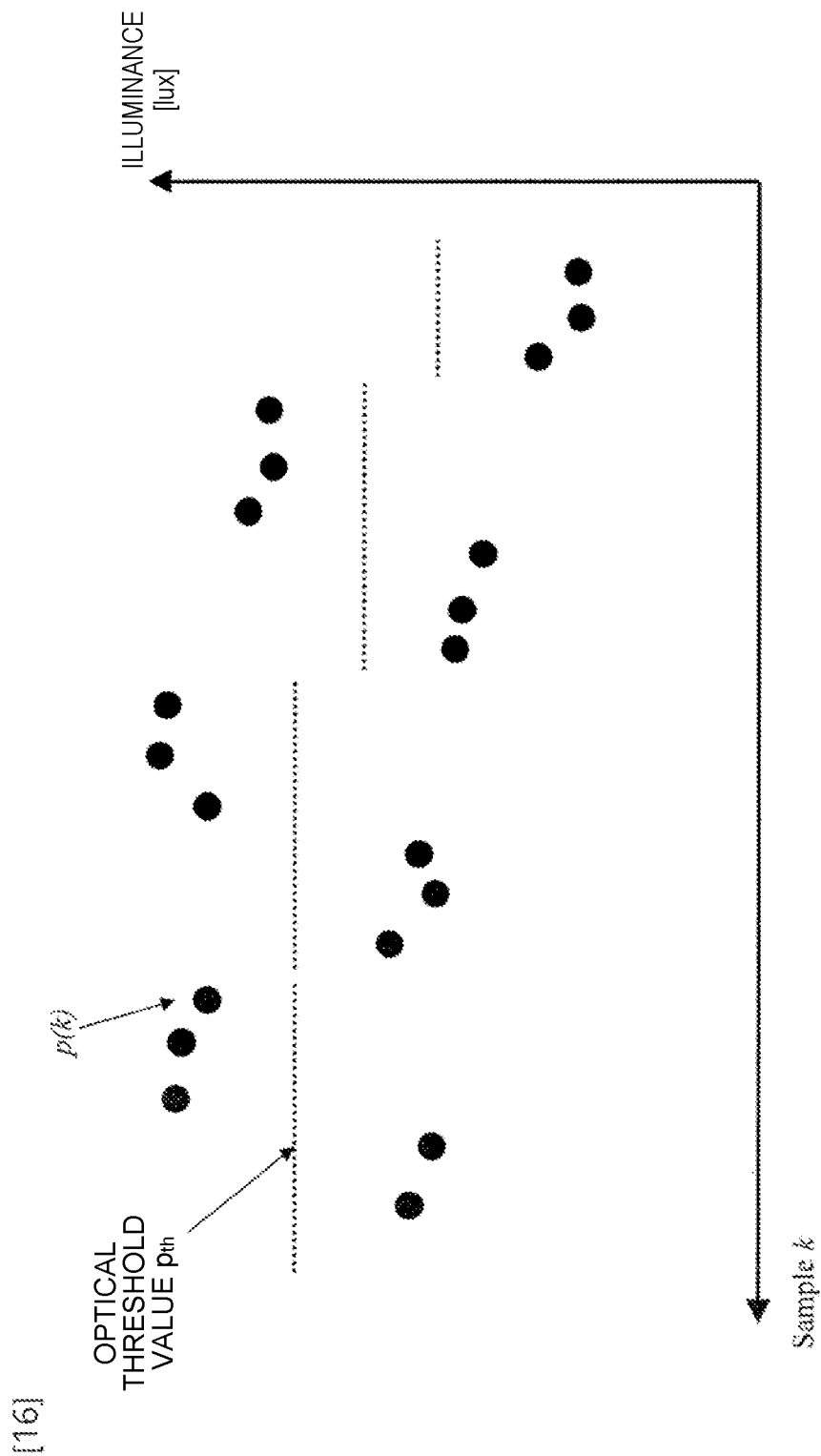
FIG. 16 is a diagram illustrating the illuminance of an optical signal received by the terminal according to the sixth embodiment.

The threshold value calculation unit 38 calculates an optimum threshold value from the light illuminance value acquired by the optical sensor information acquisition unit 31, and inputs the calculated threshold value to the threshold value determination unit 37. FIG. 16 is a diagram illustrating a process performed by the threshold value calculation unit 38. In FIG. 16, $p(k)$ is a sampling value of light illuminance (k is a sampling number), and $p_{th}$ is the threshold value. As shown in FIG. 16, the threshold value calculation unit 38 periodically calculates the threshold value $p_{th}$ based on sampling values of the illuminance of the optical signal. A threshold value calculation method will be described later.

Figure 17:
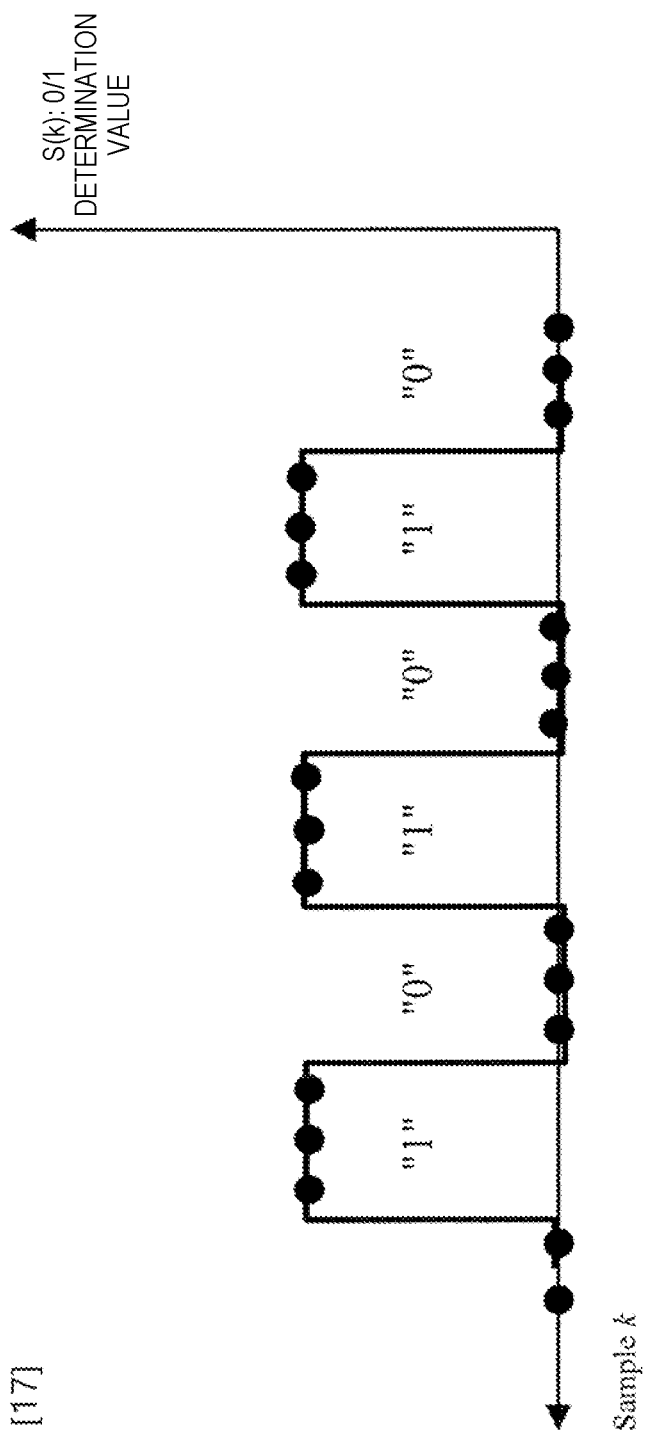
FIG. 17 is a diagram illustrating a signal binarized by a determination unit of the terminal according to the sixth embodiment.

The threshold value determination unit 37 binarizes (into 1/0) the optical signal received by the optical sensor information acquisition unit 31 using the threshold value calculated by the threshold value calculation unit 38. FIG. 17 is a diagram illustrating a process performed by the threshold value determination unit 37. The threshold value determination unit 37 determines that $S(k)=1$ when $p(k) \geq p_{th}$, and determines that $S(k)=0$ when $p(k) < p_{th}$ to binarize the received signal. Here, $S(k)$ is a determination value of 1 or 0 made by the threshold value determination unit 37 for the illuminance $p(k)$ of the sampling number k. That is, since the threshold value calculation unit 38 adaptively changes the threshold value $p_{th}$ according to the light illuminance, the threshold value determination unit 37 can accurately acquire information of the optical ID even when the position or light receiving angle of the terminal 20 changes and thereby the illuminance of the optical signal changes.

Figure 18:
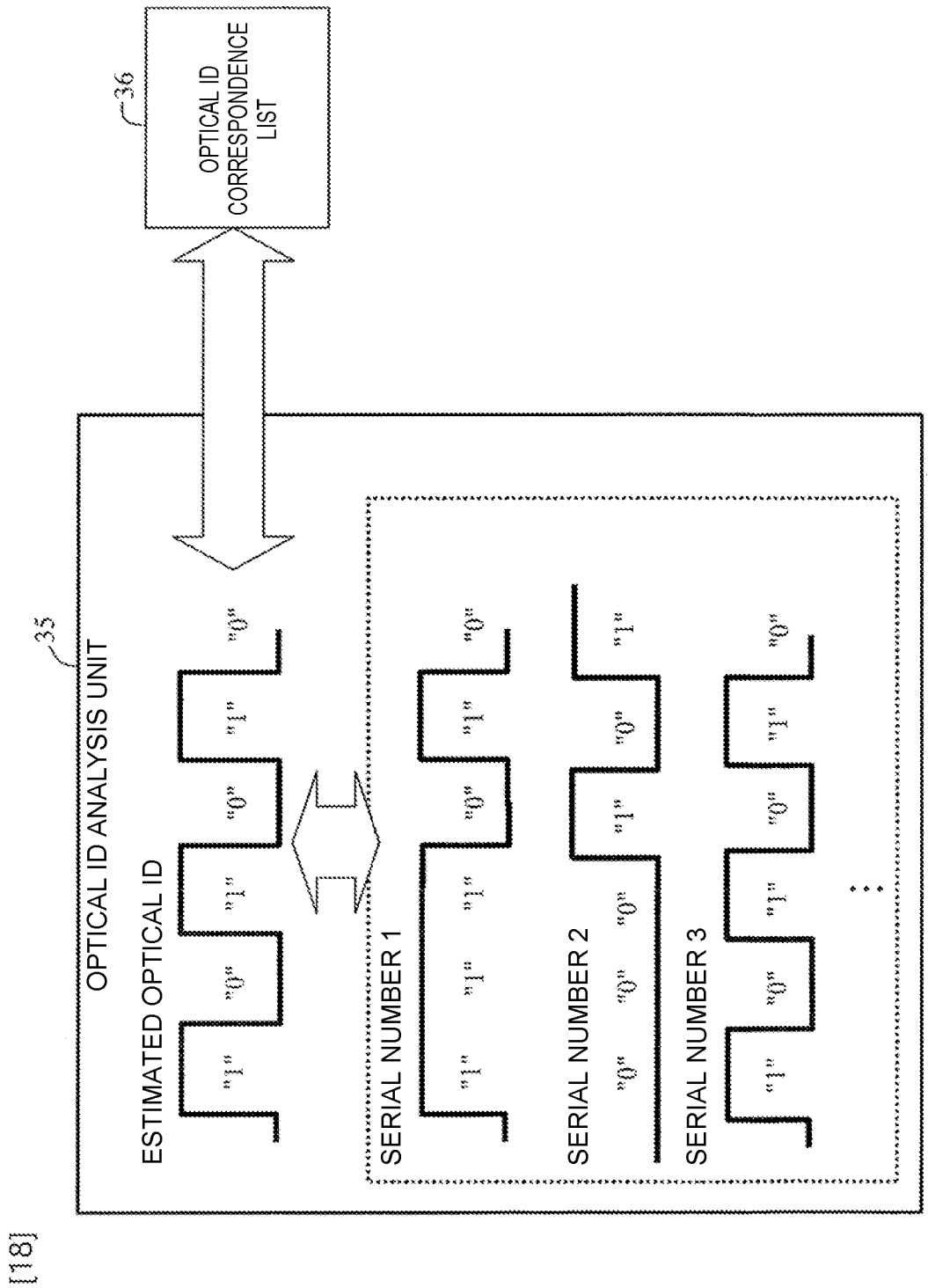
FIG. 18 is a diagram illustrating processing in an analysis unit of the terminal according to the sixth embodiment.

The optical ID analysis unit 35 extracts the optical ID based on the data binarized by the threshold value determination unit 37. FIG. 18 is a diagram illustrating a process performed by the optical ID analysis unit 35. The optical ID analysis unit 35 compares the input binarized data with signal shapes of stored optical IDs, and extracts the optical ID with a signal shape having the maximum correlation. Subsequently, the optical ID analysis unit 35 collates the optical ID with the optical ID correspondence list 36, and selects the corresponding connection operation/authentication information from the optical ID correspondence list 36. The contents described in the optical ID correspondence list 36 are the same as those of the optical ID correspondence list 46 of the base station control device 40.

The RF transmission/reception unit 33 transmits/receives RF wireless signals using a corresponding protocol. The corresponding protocol is Wi-Fi, LTE, etc. For example, Wi-Fi may support a plurality of wireless standards such as 2.4 GHZ/5 GHZ. The RF transmission/reception unit 33 transmits the connection operation/authentication information extracted by the optical ID analysis unit 35 to the RF base station 10.

[Threshold Value Calculation Method]

Figure 19:
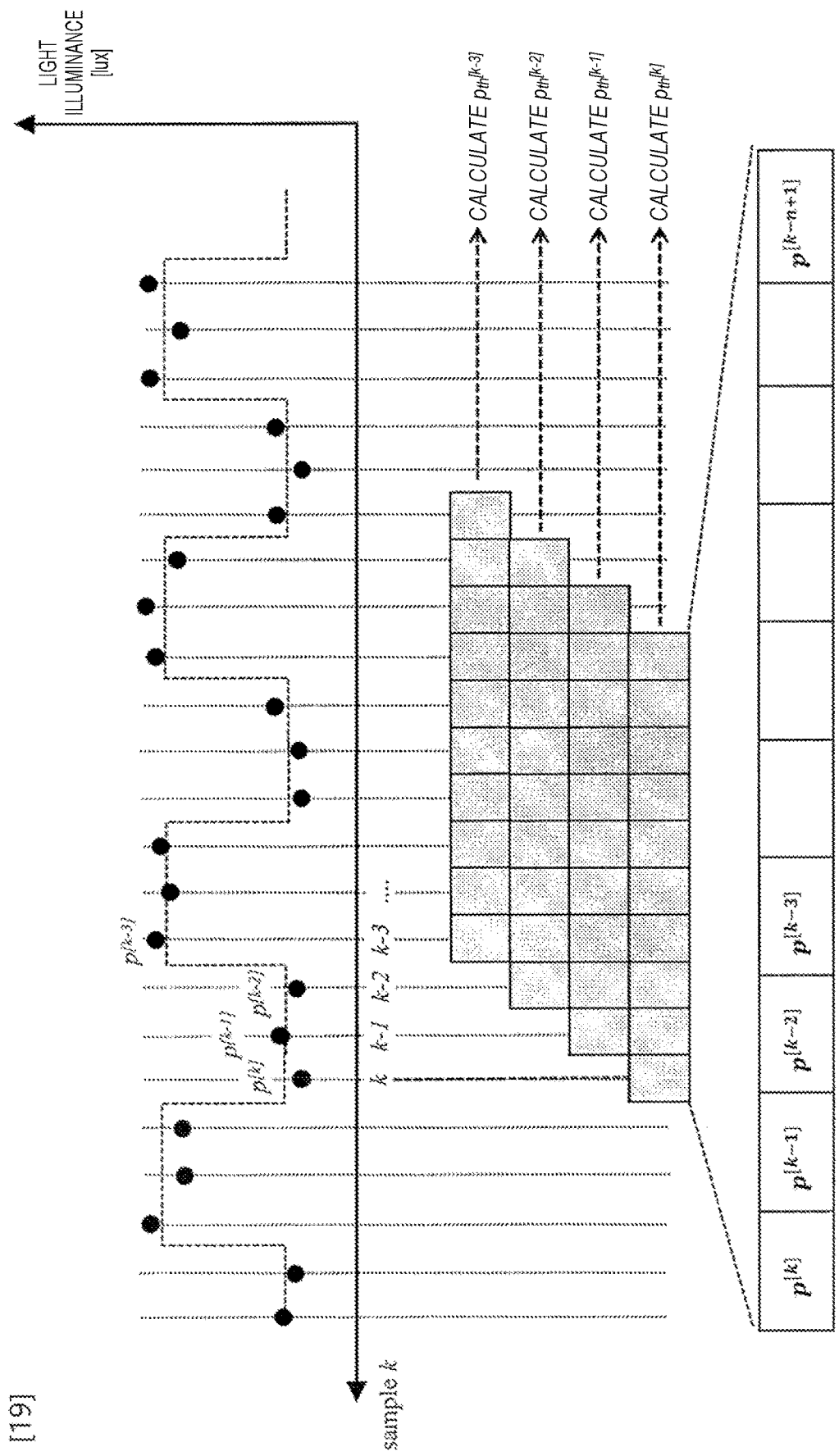
FIG. 19 is a diagram illustrating processing in a calculation unit of the terminal according to the sixth embodiment.

FIG. 19 is a diagram illustrating a calculation method performed by the threshold value calculation unit 38. FIG. 17 is an image of calculating the threshold value $p_{th}^{[k]}$ in determining the sample k. The threshold value calculation unit 38 calculates the threshold value $p_{th}^{[k]}$ for determining sample k using n past sample values ($p^{[k-n+1]}$ to $p^{[k]}$). Similarly, the threshold value calculation unit 38 calculates the threshold value $p^{th[k-1]}$ for determining sample k−1 using n past sample values ($p^{[k-n]}$ to $p^{[k-1]}$), a threshold value $p_{th}^{[k-2]}$ for determining sample k−2 using n past sample values ($p^{[k-n-1]}$ to $p^{[k-2]}$), and so on.

A specific threshold value calculation method will be described. Here, $p^{[k]}$ is the illuminance value at the time of sample k, $p_{th}^{[k]}$ is the threshold value at the time of sample k, n is the number of used data, and a is a smoothing constant.

(Example 1) This is an example in which the threshold value calculation unit 38 calculates the threshold value by a moving average method (Math. 1) using the plurality of past sampling values.

[Math. 1]

$$p_{th}^{[k]} = \frac{\sum_{j=1}^{j=n} p^{[k-j+1]}}{n} = \frac{p^{[k]} + p^{[k-1]} + \ldots + p^{[k-n+1]}}{n} \quad (1)$$

(Example 2) This is an example in which the threshold value calculation unit 38 calculates the threshold value by a weighted average method (Math. 2) using the plurality of past sampling values.

[Math. 2]

$$p_{th}^{[k]} = \frac{\sum_{j=1}^{j=n} p^{[k-j+1]}(n-j+1)}{\sum_{j=1}^{j=n}(n-j+1)} = \frac{p^{[k]} \times n + p^{[k-1]} \times (n-1) + \ldots + p^{[k-n+1]} \times 1}{n + (n-1) + \ldots + 2 + 1} \quad (2)$$

(Example 3) This is an example in which the threshold value calculation unit 38 calculates the threshold value by an exponential moving average method (Math.3) using the plurality of past sampling values.

[Math.3]

$$p_{th}^{[k]} = \alpha p^{[k]} + (1-\alpha) p_{th}^{[k-1]} \text{ i.e. } p_{th}^{[k]} = \alpha \{ p^{[k]} + (1-\alpha) p^{[k-1]} + \ldots + (1-\alpha)^n p^{[k-n]} + \ldots \} \quad (3)$$

Sixth Embodiment 2

Figure 20:
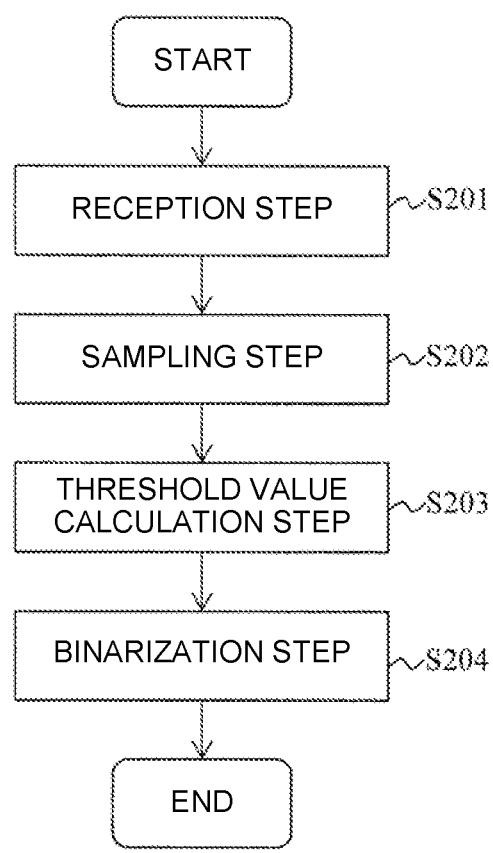
FIG. 20 is a flowchart illustrating a communication method according to the sixth embodiment.

FIG. 20 is a flowchart illustrating operation (communication method) of the terminal 20 described in the sixth embodiment 1. This communication method is a communication method in which communication between the terminal 20 and the RF base station 10 is performed by optical wireless communication and RF wireless communication, wherein the terminal 20 performs:

receiving an optical signal from the optical base station 50 (step S201);

sampling illuminance of the optical signal to acquire a sampling value (step S202);

calculating a threshold value for performing binary conversion of the optical signal based on transition of the sampling value (step S203); and performing binary conversion of the optical signal based on the threshold value (step S204).

In steps S201 and S202, the optical sensor information acquisition unit 31 converts the optical signal from the optical base station 50 into an electrical signal, and samples a light illuminance value.

In step S203, the threshold value calculation unit 38 calculates an optimum threshold value from the light illuminance value (sampling value) acquired in step S202, and inputs the calculated threshold value to the threshold value determination unit 37. As shown in FIG. 16, the threshold value calculation unit 38 periodically calculates the threshold value $p_{th}$ based on sampling values of the illuminance of the optical signal.

In step S204, the threshold value determination unit 37 binarizes (into I/O) the optical signal based on the sampling value obtained in steps S201 and S202 using the threshold value calculated in step S203. The threshold value determination unit 37 determines that S(k)=1 when $p(k) \geq p_{th}$, and determines that S(k)=0 when $p(k) < p_{th}$ to binarize the received signal.

Sixth Embodiment 3

Figure 21:
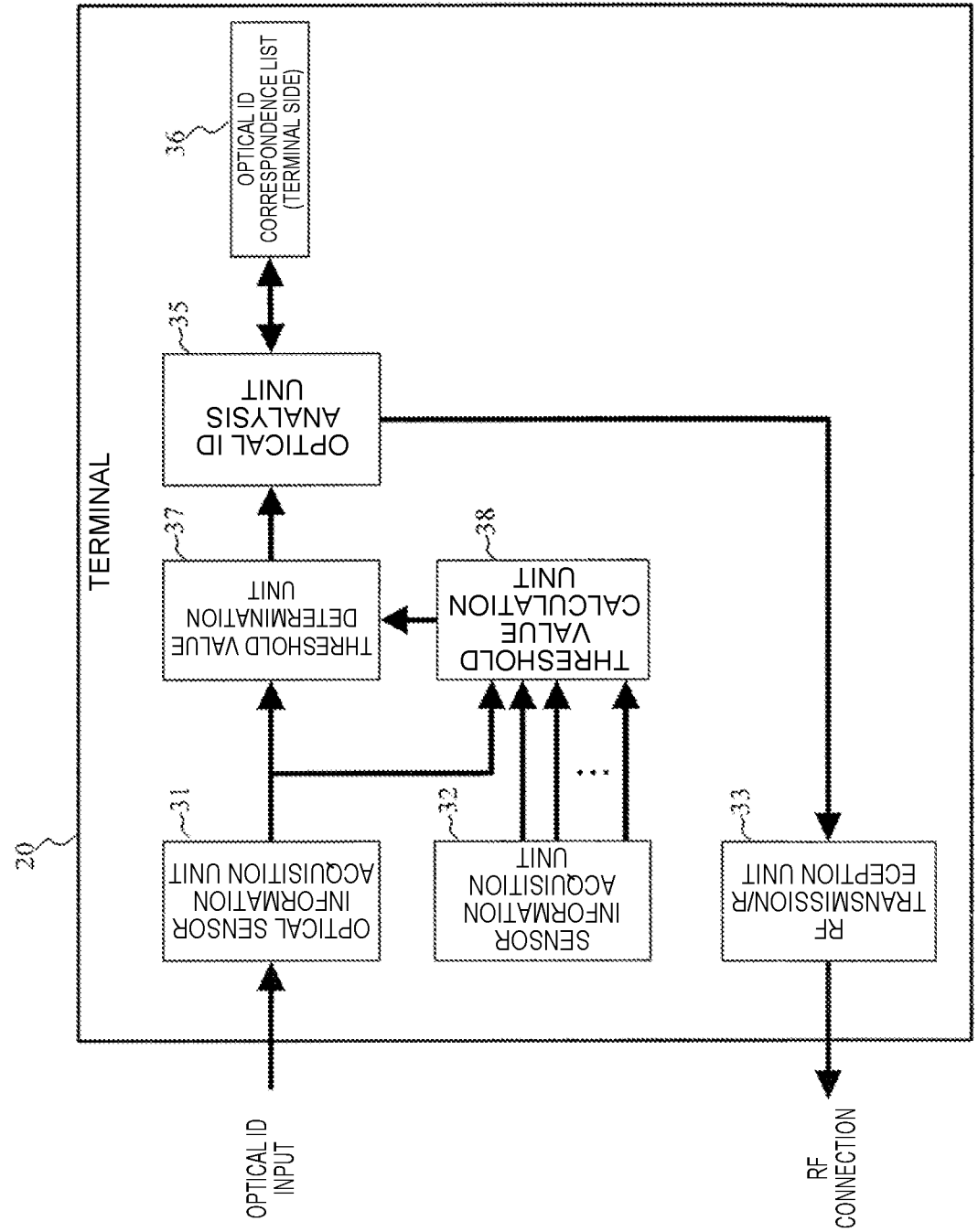
FIG. 21 is a diagram illustrating a configuration of the terminal in the communication system according to the sixth embodiment.

FIG. 21 is a diagram illustrating a configuration of the terminal 20 of this embodiment. The terminal 20 of this embodiment includes the terminal 20 of sixth embodiment 1 and further includes a sensor information acquisition unit 32. The sensor information acquisition unit 32 is a sensor that acquires physical information other than the illuminance of the optical signal. Then, the calculation unit (threshold value calculation unit 38) varies the smoothing constant $\alpha$ used in the exponential moving average method based on sensor information output from the sensor.

Here, the physical information other than the illuminance of the optical signal is information such as the acceleration of the terminal 20 from an acceleration sensor, the tilt of the terminal 20 from a gyro sensor, and the direction (orientation) of the terminal 20 from a magnetic sensor.

The sensor information acquisition unit 32 acquires the physical information and inputs it to the threshold value calculation unit 38. The threshold value calculation unit 38 of this embodiment uses not only the illuminance of the optical signal but also the physical information when calculating the threshold value. FIG. 22 is a diagram illustrating an example in which the threshold value calculation unit 38 sets the smoothing constant $\alpha$ using the physical information when calculating the threshold value by the exponential moving average.

The acceleration sensor acquires the acceleration of the terminal 20 for each of the three axes (x, y, z). The illuminance value of the background fluctuates as the terminal 20 moves. Therefore, by setting a smoothing constant $\alpha$ corresponding to the acceleration in Math. 3 as shown in FIG. 22, it is possible to increase the followability of the threshold value with respect to the illuminance value fluctuation. Specifically, when the illuminance change in the background is small (when the acceleration is small), the followability of the threshold value with respect to the illuminance becomes too high if α is set to be too large, so it is effective to take a moderately small value. On the other hand, when the illuminance change in the background is large (when the acceleration value is large), the followability of the threshold value with respect to the illuminance can be increased by setting a to be relatively large.

Note that FIG. 22 is an example, and the setting value for α may be changed flexibly in consideration of an illuminance profile (directivity of the light source) for a lighting to be used. Further, the threshold value calculation unit 38 may use sensor information other than the acceleration sensor.

Seventh Embodiment 1

This embodiment will describe a configuration that can reduce the error rate even when the transmitting side and the receiving side are asynchronous. The terminal according to this embodiment samples the optical signal at a sufficiently finer granularity than the transmission pattern of I/O, and performs majority determination using a plurality of sampling values.

Figure 23:
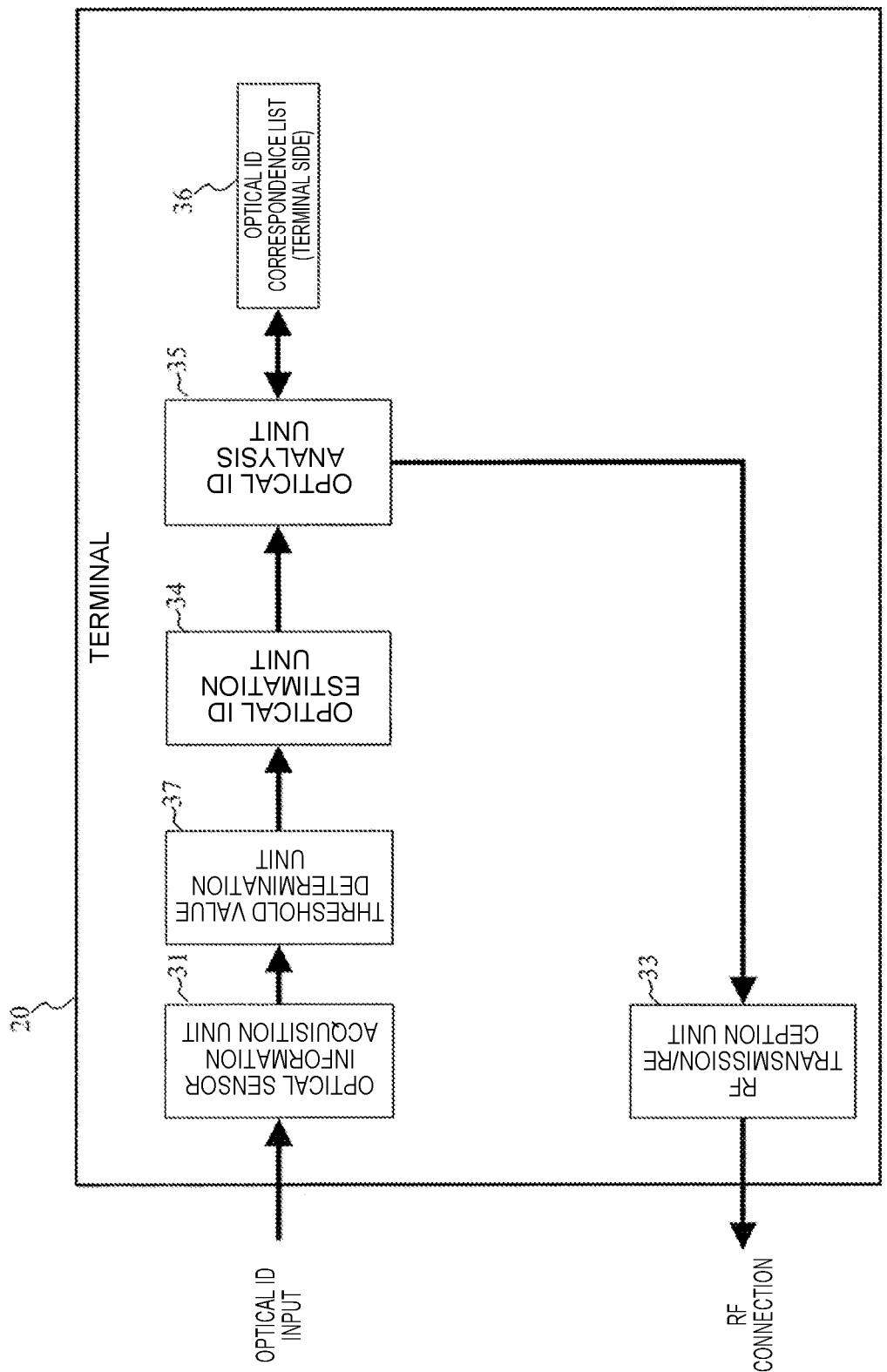
FIG. 23 is a diagram illustrating a configuration of a terminal in a communication system according to a seventh embodiment.

FIG. 23 is a diagram illustrating a configuration of the terminal 20. The terminal 20 includes:

an optical sensor (optical sensor information acquisition unit 31) that receives an optical signal from the optical base station 50;

a determination unit (threshold value determination unit 37) that samples illuminance of the optical signal at sampling points with a finer granularity than a bit pattern of the optical signal to acquire sampling values, and converts the optical signal into binary values (0/1) by comparing the sampling values with any threshold value; and an estimation unit (optical ID estimation unit) that has a determination time which is shorter than the time of one bit of the bit pattern and longer than the time corresponding to the number of intervals between the sampling points included in one bit of the bit pattern, and estimates ID information included in the optical signal using the value of the majority of the binary values included in the determination time as the value of the bit.

The function and operation of the optical sensor information acquisition unit 31 are the same as those in the sixth embodiment.

In addition, the terminal 20 further includes:

a list (optical ID correspondence list 36) that describes correspondence between ID information and authentication information for starting the RF wireless communication;

an analysis unit (optical ID analysis unit 35) that refers to the list for the ID information estimated by the estimation unit, and acquires the corresponding authentication information; and an RF transmission/reception unit 33 that transmits the authentication information acquired by the analysis unit to the RF base station 10 by the RF wireless communication.

The function and operation of the RF transmission/reception unit 33 are the same as those in the sixth embodiment.

Figure 24:
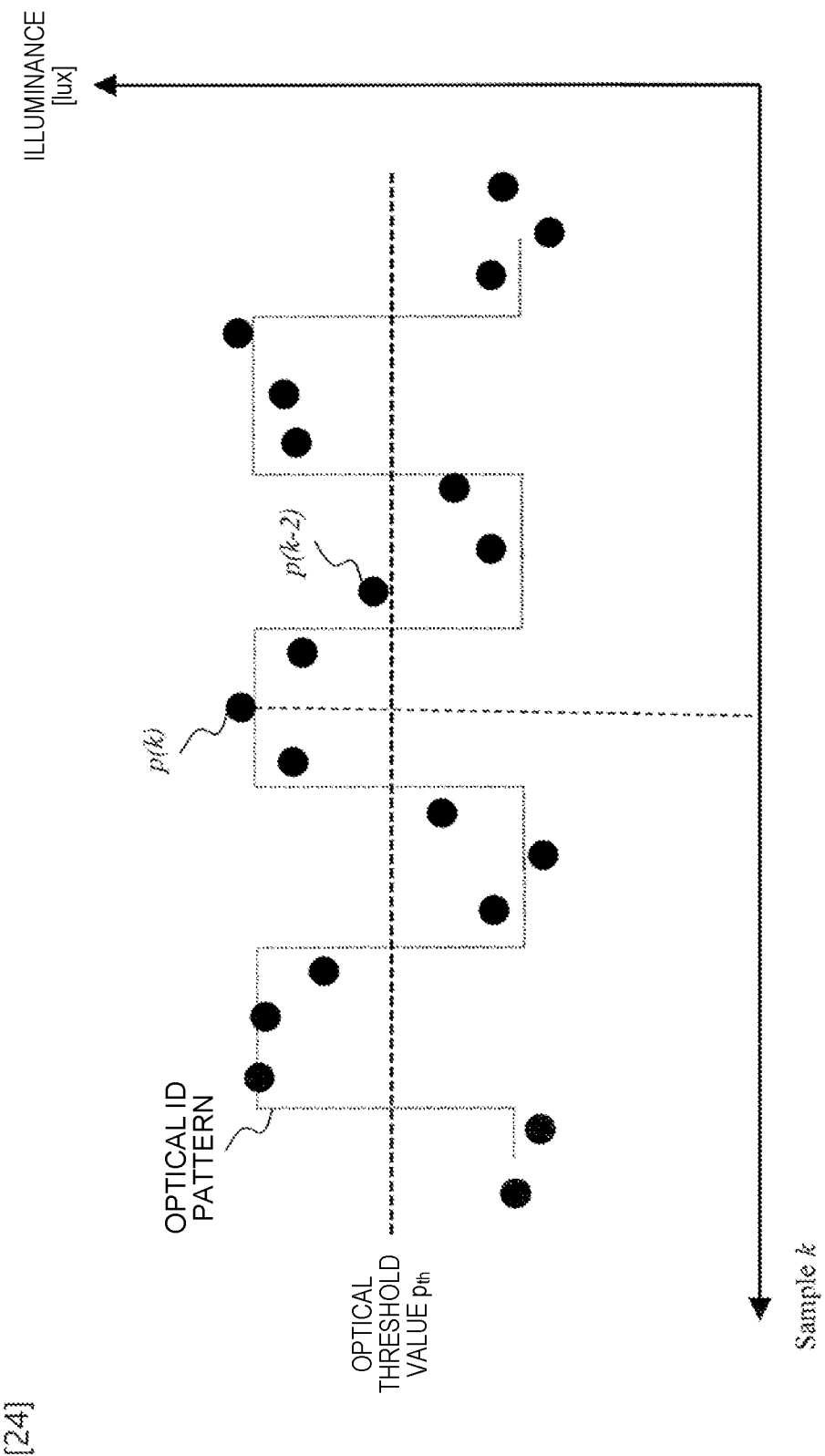
FIG. 24 is a diagram illustrating the illuminance of an optical signal received by the terminal according to the seventh embodiment.
Figure 25:
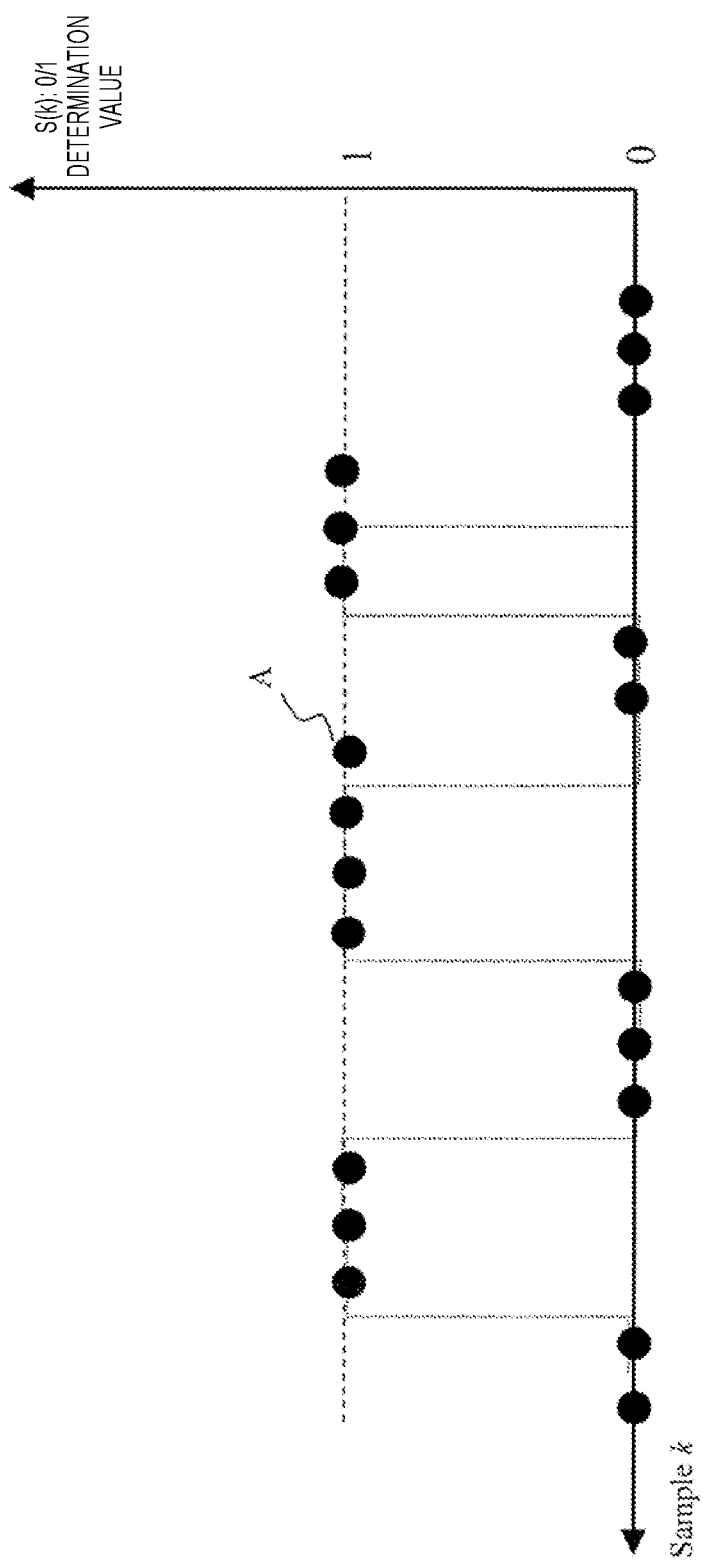
FIG. 25 is a diagram illustrating a signal binarized by a determination unit of the terminal according to the seventh embodiment.

The threshold value determination unit 37 binarizes (into 1/0) the optical signal received by the optical sensor information acquisition unit 31 using the preset threshold value $p_{th}$. FIG. 24 and FIG. 25 are diagrams illustrating a process performed by the threshold value determination unit 37. First, a received signal is input from the sensor information acquisition unit 31 to the threshold value determination unit 37. As shown in FIG. 24, the threshold value determination unit 37 samples this electrical signal at a finer granularity than the pattern of the optical ID. Here, "finer granularity than the pattern of the optical ID" means an interval shorter than the length (time) of each bit constituting the optical ID. In the example of FIG. 24, the granularity is an interval in which each bit constituting the optical ID can be sampled three times. In FIG. 24, p(k) is a sampling value and k is a sampling number. The sampling value may be a higher value or a lower value than the true value due to various factors. Here, attention will be paid to the sampling value p(k−2).

The threshold value determination unit 37 determines that S (k)=1 when p(k)≥ $p_{th}$, and determines that S (k)=0 when p(k)<$p_{th}$ to binarize the received signal. Here, S (k) is a determination value of 1 or 0 made by the threshold value determination unit 37 for the illuminance p(k) of the sampling number k. FIG. 25 shows the sampling values in FIG. 24 binarized with the threshold value $p_{th}$. At the point A in FIG. 25, the sampling value p(k−2) should normally be determined as "0", but it is erroneously determined as "1" due to the large influence of noise.

Figure 26:
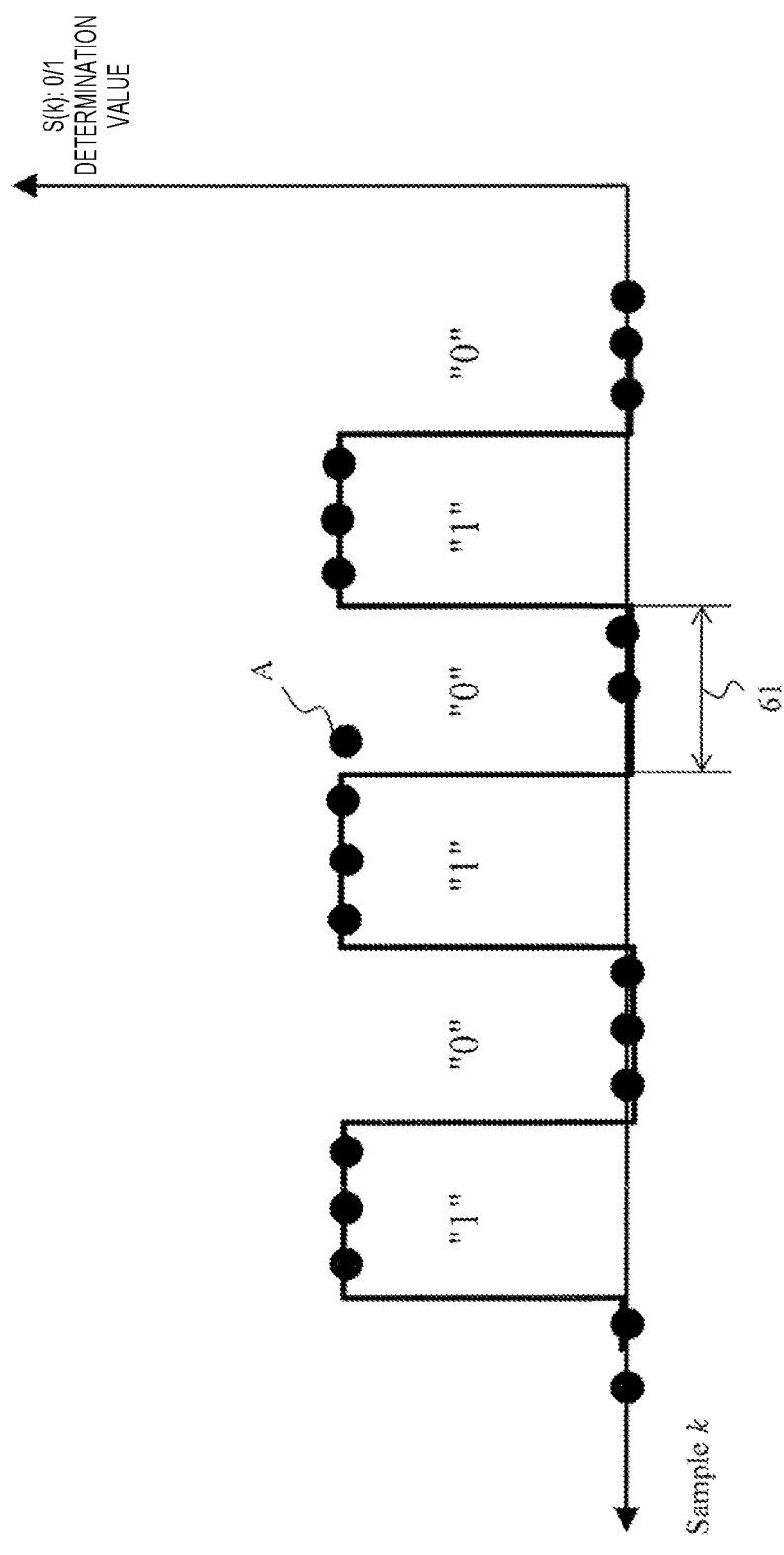
FIG. 26 is a diagram illustrating processing in an analysis unit of the terminal according to the seventh embodiment.

The optical ID estimation unit 34 estimates each bit value of the received signal by a majority determination scheme using a determination processing window. FIG. 26 is a bit pattern of the received signal estimated by the optical ID estimation unit 34. Since the optical ID estimation unit 34 has estimated the bit values by the majority determination scheme, the bit value of the bit 61 can be correctly acquired regardless of the influence of the point A. The majority determination scheme performed by the optical ID estimation unit 34 will be described later.

Figure 28:
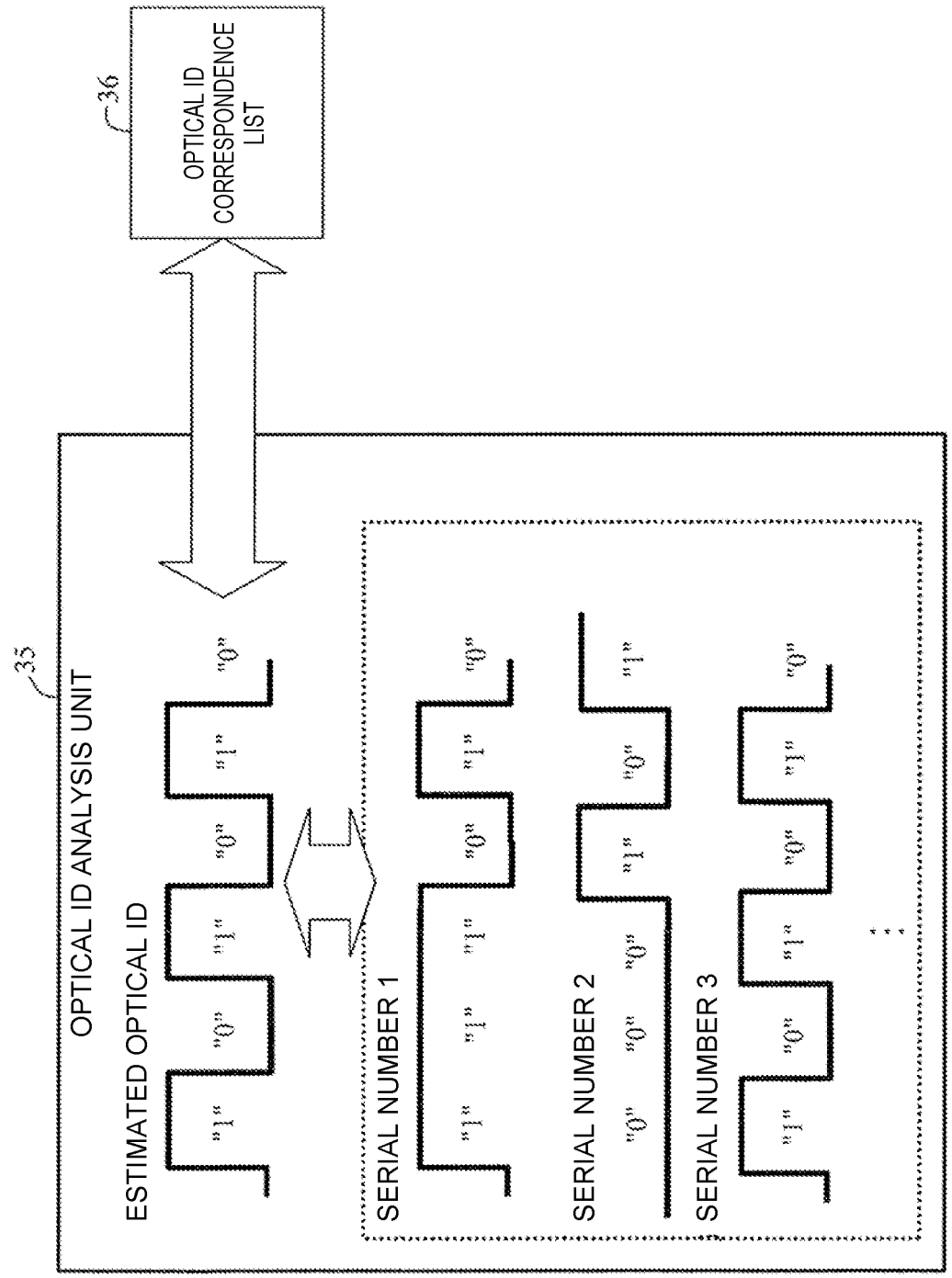
FIG. 28 is a diagram illustrating processing in an optical ID analysis unit of the terminal according to the seventh embodiment.

The optical ID analysis unit 35 extracts an optical ID from the bit pattern estimated by the threshold value calculation unit 34. FIG. 28 is a diagram illustrating a process performed by the optical ID analysis unit 35. The optical ID analysis unit 35 compares the input bit pattern with the signal shapes of the stored optical IDs, and extracts the optical ID with a signal shape having the maximum correlation. Subsequently, the optical ID analysis unit 35 collates the optical ID with the optical ID correspondence list 36, and selects the corresponding connection operation/authentication information from the optical ID correspondence list 36. The contents described in the optical ID correspondence list 36 are the same as those of the optical ID correspondence list 46 of the base station control device 40.

[Majority Determination Scheme]

Figure 27:
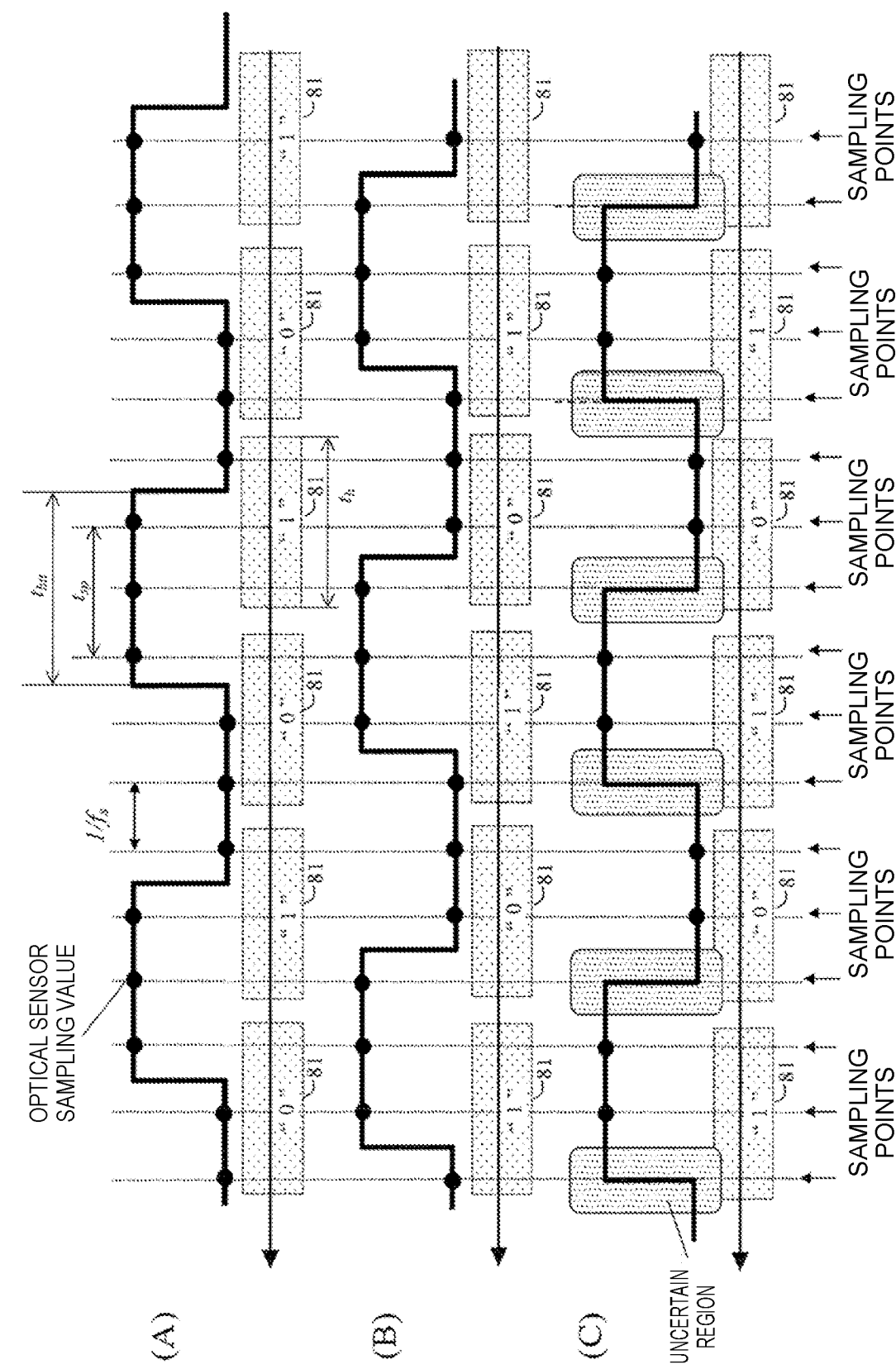
FIG. 27 is a diagram illustrating processing in an optical ID estimation unit of the terminal according to the seventh embodiment.

FIG. 27 is a diagram illustrating a majority determination scheme performed by the optical ID estimation unit 34. FIG. 27 shows a state in which the transmitting side and the receiving side are out of synchronization. FIG. 27 (A) and FIG. 27 (B) show cases where all of the sampling points are not in an uncertain region, FIG. 27 (C) shows a case where one of the sampling points is in an uncertain region.

The optical ID estimation unit 34 has a determination processing window 81 that is used when performing majority determination. The time of the determination processing window 81 (determination time) th is shorter than the time $t_{bit}$ of one bit of the bit pattern and longer than the time ($1/f_s \times n$) corresponding to the number n of intervals between the sampling points included in one bit of the bit pattern. In the example of FIG. 27, three sampling points are included in the time $t_{bit}$ of one bit, so the number n of intervals between the sampling points is 2. Therefore, the determination time is as follows:

$$1/f_s \times 2 < t_h < t_{bit}$$

The majority determination scheme is performed as follows. The optical ID estimation unit 34 performs majority determination for the binarized data to determine which determination value (0/1) is greater in number within the determination processing windows 81. That is, when the number of observations of the determination value of "1" is 2 or 3 within the determination processing window 81, "1" is assigned to the determination processing window 81 (bit), and when the number of observations of the determination value of "1" is 0 or 1 within the determination processing window 81, "0" is assigned to the determination processing window 81 (bit).

By performing such majority determination, it is possible to avoid erroneous bit determination not only in the case where all of the sampling points are not in an uncertain region as in FIG. 27 (A) and FIG. 27 (B), but also in the case where one of the sampling points is in an uncertain region as in FIG. 27 (C).

Such majority determination can avoid erroneous bit determination even when there is the erroneously determined sample A as shown in FIG. 25.

Seventh Embodiment 2

Figure 29:
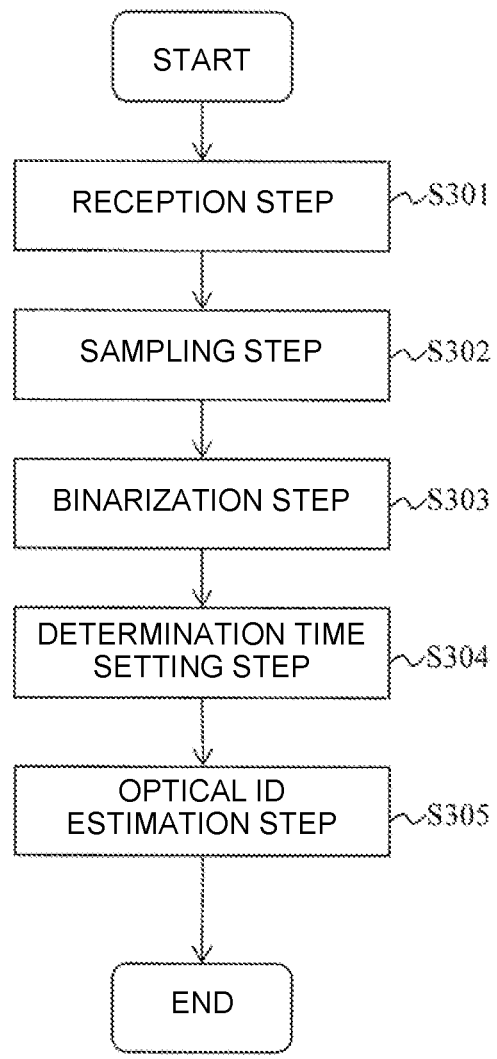
FIG. 29 is a first flowchart illustrating a communication method according to the seventh embodiment.

FIG. 29 is a flowchart illustrating operation (communication method) of the terminal 20 of this embodiment. This communication method is a communication method in which communication between the terminal 20 and the RF base station 10 is performed by optical wireless communication and RF wireless communication, wherein the terminal 20 performs:
receiving an optical signal from the optical base station 50 (step S301);
sampling illuminance of the optical signal at sampling points with a finer granularity than a bit pattern of the optical signal to acquire sampling values (step S302);
converting the optical signal into binary values by comparing the sampling values with any threshold value (step S303);
setting a determination time which is shorter than the time of one bit of the bit pattern and longer than the time corresponding to the number of intervals between the sampling points included in one bit of the bit pattern (step S304); and
estimating ID information included in the optical signal using the value of the majority of the binary values included in the determination time as the value of the bit (step S305).

In steps S301 and S302, the optical sensor information acquisition unit 31 converts the optical signal from the optical base station 50 into an electrical signal, and samples a light illuminance value.

In step S303, the threshold value determination unit 37 binarizes (into I/O) the optical signal based on the sampling value obtained in steps S301 and S302 using a predetermined threshold value. The threshold value determination unit 37 determines that S (k)=1 when $p(k) \geq p_{th}$, and determines that S (k)=0 when $p(k) < p_{th}$ to binarize the received signal.

In step S304, the optical ID estimation unit 34 sets the determination processing window 81 described in FIG. 27.

In step S305, the optical ID estimation unit 34 determines each bit value of the received signal from the binarized data using the majority determination scheme.

Figure 30:
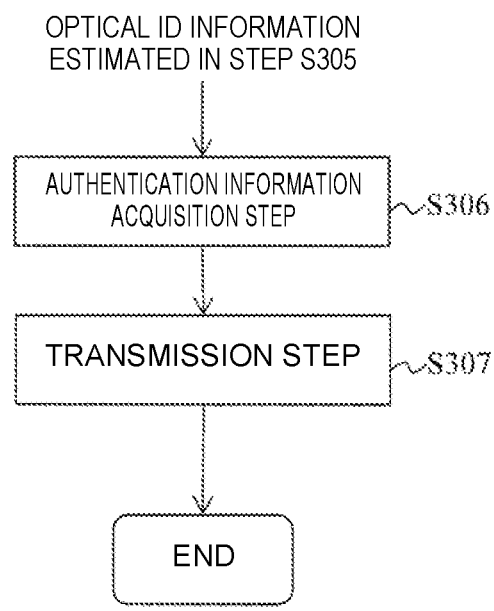
FIG. 30 is a second flowchart illustrating a communication method according to the seventh embodiment.

FIG. 30 is a flowchart illustrating operation (communication method) of the terminal 20 of this embodiment. In this communication method, this operation may be performed after the operation described in FIG. 29. In other words, this communication method further performs:
referring to a list (optical ID correspondence list 36) that describes correspondence between ID information and authentication information for starting the RF wireless communication for the estimated ID information, and acquiring the corresponding authentication information (step S306), and
transmitting the authentication information to the RF base station 10 by the RF wireless communication (step S307).

The authentication information transmitted in step S307 is received by the RF base station 10. Then, the terminal 20 for which matching of the authentication information can be confirmed by the RF base station 10 is permitted to communicate with the upper network 30.

Eighth Embodiment

This embodiment will describe a configuration for limiting the communication area and ensuring the safety of communication and the stability of communication. The optical base station 50 according to this embodiment generates a signal pattern corresponding to the optical ID, outputs an optical signal corresponding to the generated signal pattern, controls the beam shape of the output optical signal, and sends it out into the space.

The optical base station control unit 42 extracts the optical ID, and generates a signal pattern corresponding to the extracted optical ID. For example, when using the connection information and authentication information of the serial number of "1" shown in the optical ID correspondence list shown in FIG. 2, the optical base station control unit 42 generates "1010" as the signal pattern when extracting "1010" as the optical ID. It is not necessary that the signal pattern is also set to "1010" in response to the optical ID of "1010", for example, a signal pattern such as "101011" may be used. In the case where the signal pattern is analog, for example, a repetitive signal pattern at a frequency of 1 Hz is used when the optical ID is "1010". When the optical ID is "1000", for example, a repetitive signal pattern at a frequency of 2 Hz is used.

The optical transmitter 51 outputs an optical signal with the signal pattern from the optical base station control unit 42. When the owner of the wireless terminal device 20 has entered the area of the RF base station 10, discomfort is not given to the person if the fluctuation in the optical signal sent out from the beam control unit 52 has such a modulation degree that it cannot be perceived by humans. According to Non-Patent Literature 1, the optical modulation degree is preferably 20% or less. If it is at this level of modulation degree, humans cannot perceive fluctuation in light intensity in a situation where they are concentrating on some work. More preferably, the optical modulation degree is 7% or less. If it is at this level of modulation degree, humans cannot perceive fluctuation in light intensity regardless of their activity states.

Figure 31:
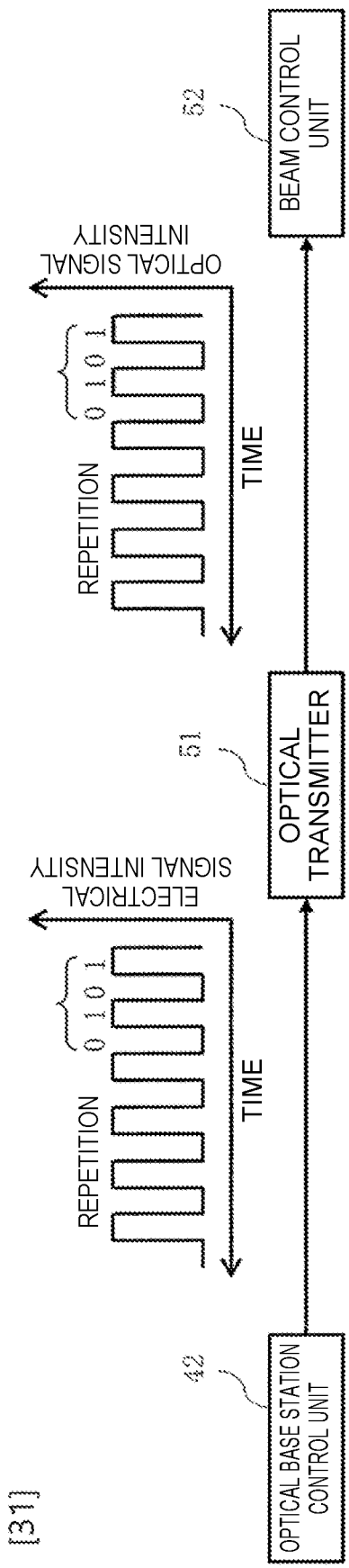
FIG. 31 shows an example of characteristics of an optical signal output from an optical transmitter according to an eighth embodiment.

Examples of the optical ID generated by the optical base station control unit 42 and the optical signal output from an optical transmission circuit 13 are shown in FIGS. 31 to 34. FIG. 31 shows an example in which the optical base station control unit 42 generates a signal pattern of "1010" which is a digital signal, and the optical transmitter 51 outputs an optical signal of "1010" as a digital signal. In this case, the optical signal output from the optical transmitter 51 and light from a lighting device other than the optical transmitter 51 are combined, and a configuration is made such that both types of light result in an optical modulation degree equal to or less than a predetermined percentage.

Figure 32:
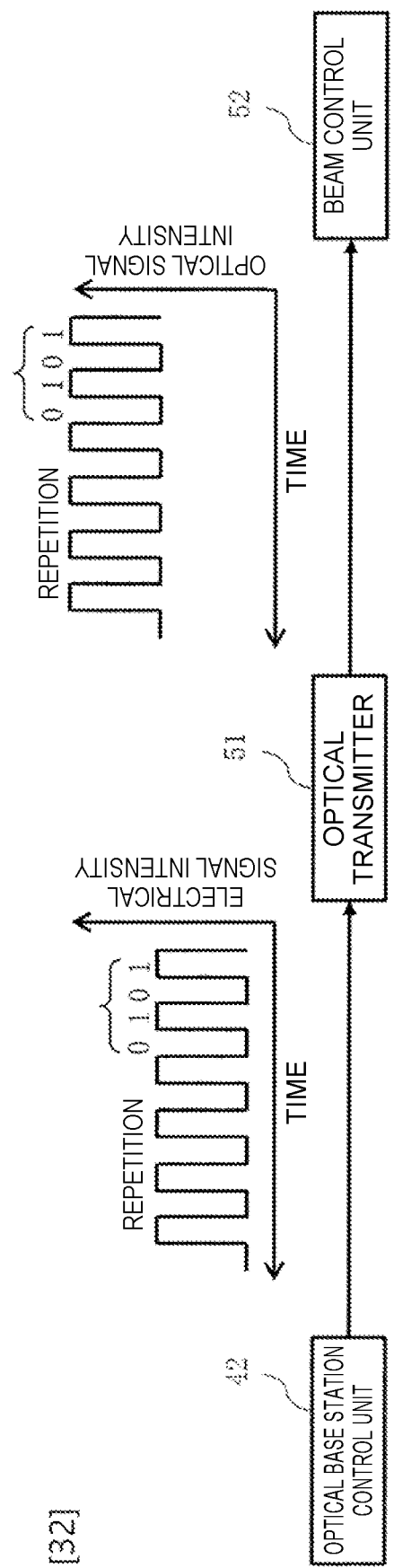
FIG. 32 shows an example of characteristics of an optical signal output from the optical transmitter according to the eighth embodiment.

FIG. 32 shows an example in which the optical base station control unit 42 generates a signal pattern of "1010" which is an electrical signal, and the optical transmitter 51 outputs an optical signal of "1010" as a digital signal. The optical transmitter 51 is configured so that the optical signal of "1010" itself contains bias light and the optical modulation degree of the optical signal output from the optical transmitter 51 is equal to or less than a predetermined percentage. In this case, the optical transmitter 51 has both the function of outputting an optical signal and the function of lighting.

Figure 33:
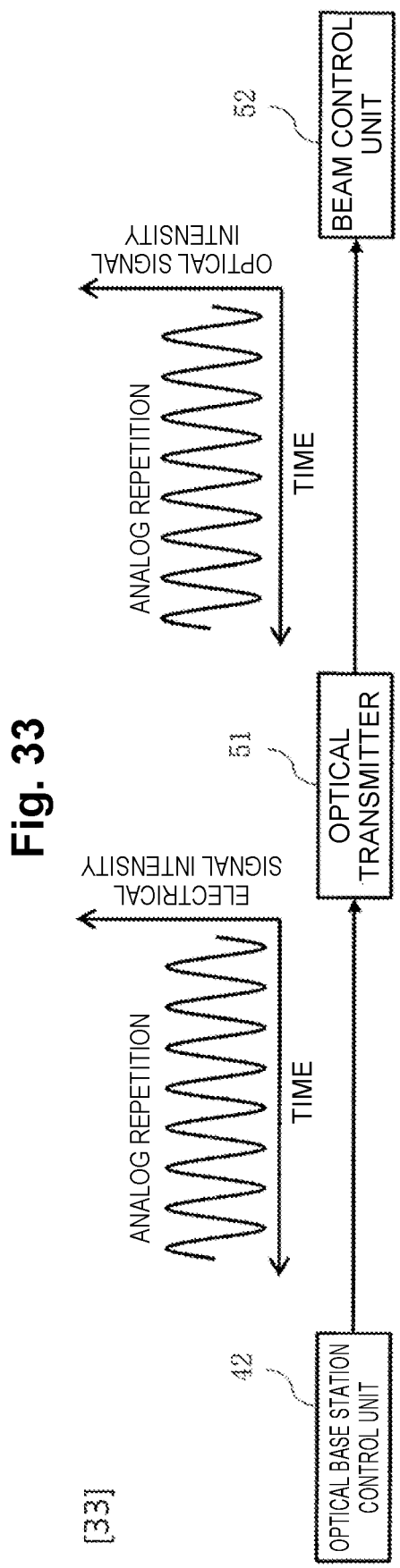
FIG. 33 shows an example of characteristics of an optical signal output from the optical transmitter according to the eighth embodiment.

FIG. 33 shows an example in which the optical base station control unit 42 generates an analog repetitive signal pattern which is an electrical signal, and the optical transmitter 51 outputs a repetitive optical signal as an analog signal. In this case, the optical signal output from the optical transmitter 51 and light from a lighting device other than the optical transmitter 51 are combined. Here, a configuration is made such that the combined light results in an optical modulation degree equal to or less than a predetermined percentage.

Figure 34:
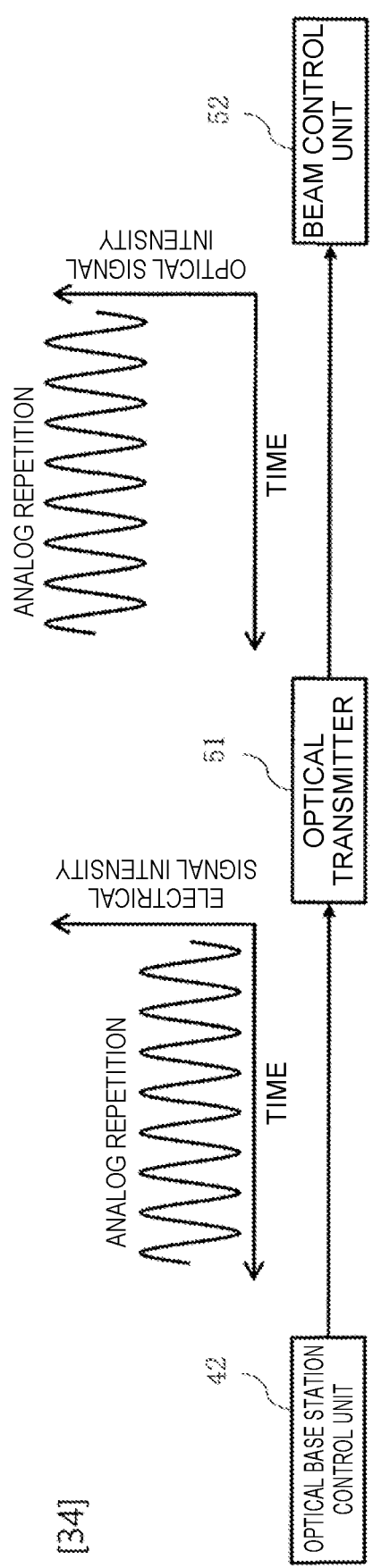
FIG. 34 shows an example of characteristics of an optical signal output from the optical transmitter according to the eighth embodiment.

FIG. 34 shows an example in which the optical base station control unit 42 generates an analog repetitive signal pattern which is an electrical signal, and the optical transmitter 51 outputs a repetitive optical signal as an analog signal. In FIG. 34, the optical transmitter 51 is configured so that the repetitive optical signal itself contains bias light and the optical modulation degree of the optical signal output from the optical transmitter 51 is equal to or less than a predetermined percentage. In this case, the optical transmitter 51 has both the function of outputting an optical signal and the function of lighting.

The optical transmitter 51 may have a configuration in which frequency modulation or wavelength modulation is used instead of intensity modulation. In this case, the frequency or wavelength of an optical signal of the optical transmission circuit is varied according to the intensity of the signal pattern.

The beam control unit 52 controls the beam shape of the optical signal from the optical transmitter 51, and sends it out into the set space of the RF base station 10. This is to set the communicable area of this wireless communication system. By utilizing the linearity of output of light waves, it is possible to limit the communication area and ensure the safety of communication. A reflector or a transparent refractive index body can be used for controlling the beam shape.

Figure 35:
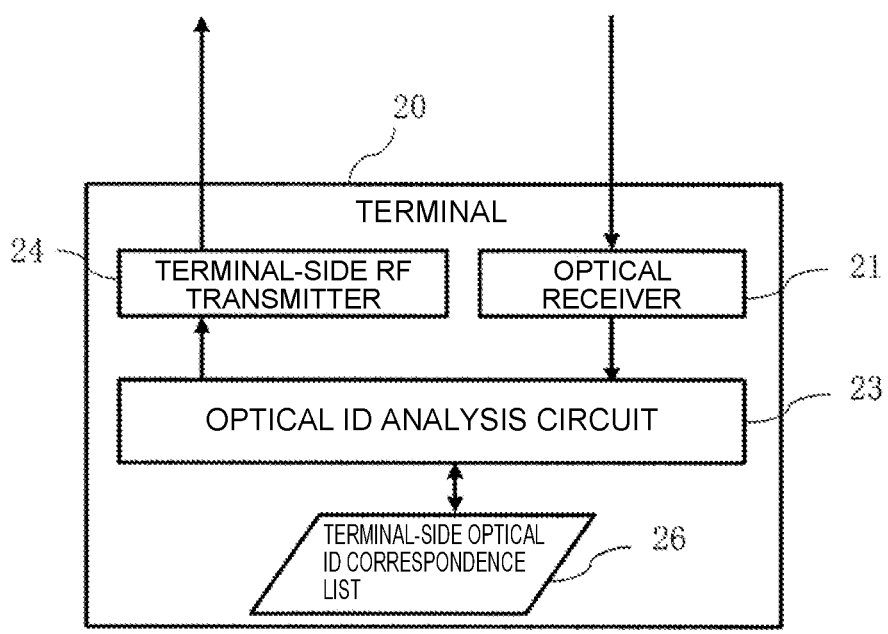
FIG. 35 shows an example of a configuration of a terminal in a communication system according to the eighth embodiment.

FIG. 35 is a diagram illustrating a configuration of the terminal 20. The terminal 20 includes:

an optical receiver 21 that receives an optical signal from the beam control unit 52 and converts it into a signal pattern;

a terminal-side optical ID list 22 that includes combination information of an optical ID and connection information and authentication information for wireless communication corresponding thereto;

an optical ID analysis circuit 23 that reproduces an optical ID from the signal pattern from the optical base station 50, collates the optical ID with the terminal-side optical ID correspondence list 26, and extracts the corresponding connection information/authentication information; and a terminal-side RF transmitter 24 that transmits the authentication information from the optical ID analysis circuit 23 by predetermined RF wireless which is in accordance with the connection information from the optical ID analysis circuit 23.

The optical receiver 21 receives an optical signal from the beam control unit 52 and converts it into a signal pattern of an electrical signal. For receiving light, it is sufficient to select a light receiving element according to the wavelength of light generated by the optical transmitter 51. Only when the wireless terminal device 20 is in the communicable area set by the beam control unit 52, the optical receiver 21 can receive an optical signal from the beam control unit 52. Since a high-speed demodulation circuit is not required for receiving an optical signal, a wireless terminal device having a simple configuration can be realized. The optical receiver 21 receives the optical signal, and removes the bias component to extract the electrical signal pattern. When the optical signal is a digital signal of "1010", for example, the optical signal is converted into an electrical signal pattern of "1010". When the optical signal is an analog signal, for example, it is converted into an electrical signal pattern having a repetition frequency of 1 Hz.

The optical ID analysis circuit 23 reproduces an optical ID from the signal pattern from the optical receiver 21, and collates the optical ID with the terminal-side optical ID correspondence list 26. Next, the connection information and authentication information corresponding to the optical ID are extracted. For example, the optical ID analysis circuit 23 reproduces an optical ID of "1010" from the signal pattern of "1010" from the optical receiver 21, and collates the optical ID of "1010" with the terminal-side optical ID correspondence list 26. For example, the optical ID analysis circuit 23 reproduces an optical ID of "1010" from the signal pattern having a repetition frequency of 1 Hz from the optical receiver 21, and collates the optical ID of "1010" with the terminal-side optical ID correspondence list 22. The optical ID analysis circuit 23 extracts the connection information and authentication information of the serial number of "1" corresponding to the optical ID of "1010". When the optical ID analysis circuit 23 collates the reproduced optical ID with the terminal-side optical ID correspondence list 22, the optical ID that completely matches it may be detected, or the optical ID having the maximum correlation coefficient may be detected. When the wireless terminal device 20 is present in the areas of a plurality of RF base stations 10, it will receive an optical signal from each of the plurality of optical base stations 50, and reproduce a plurality of optical IDs. In this case, the priorities of the plurality of serial numbers are extracted from within the terminal-side optical ID correspondence list 22, and the connection information and authentication information of the serial number having high priority are extracted.

The terminal-side RF transmitter 24 sets an RF wireless standard such as a predetermined wireless scheme, frequency, and channel in accordance with the connection information extracted by the optical ID analysis circuit 23. Next, the terminal-side RF transmitter 24 transmits the authentication information extracted by the optical ID analysis circuit 23 by RF wireless set toward the RF base station 10. The stability of communication of the wireless communication system according to the present disclosure can be ensured by utilizing the diffusivity of radio waves for transmission of the authentication information and information communication after authentication.

INDUSTRIAL APPLICABILITY

The present disclosure can be applied to the information communication industry.

REFERENCE SIGNS LIST

10 RF base station
20 Terminal
21 Optical receiver
23 Optical ID analysis circuit
24 Terminal-side RF transmitter
30 Upper network
31 Optical sensor information acquisition unit
33 RF transmission/reception unit
34 Optical ID estimation unit
35 Optical ID analysis unit
37 Threshold value determination unit
38 Threshold value calculation unit
40 Base station control device
41 Authentication information integration control unit
42 Optical base station control unit
26, 36, 46 Optical ID correspondence list
50 Optical base station
51 Optical transmitter
52 Beam control unit

The invention claimed is:

1. A wireless communication system comprising:
one or more wireless base stations that wirelessly communicate with a terminal;
a base station control device that collects wireless base station information from each wireless base station, determines a wireless base station that wirelessly communicates with the terminal using the collected wireless base station information, and transmits an optical ID corresponding to the determined wireless base station; and
one or more optical base stations that receive the optical ID from the base station control device, and transmit the received optical ID to the terminal using an optical signal,
wherein the wireless base station determined by the base station control device wirelessly communicates with the terminal that receives the optical ID.

2. The wireless communication system according to claim 1,
wherein
the optical ID corresponds to connection information and authentication information that are used when the wireless base station performs wireless communication, and
the base station control device transmits the optical ID corresponding to the connection information and the authentication information for the wireless base station to the optical base stations.

3. A wireless communication method executed by a wireless communication system in which one or more wireless base stations and one or more optical base stations are connected to a base station control device,
wherein the base station control device
collects wireless base station information from each wireless base station,
determines a wireless base station that wirelessly communicates with a terminal using the collected wireless base station information, and transmits an optical ID corresponding to the determined wireless base station to at least one of the one or more optical base stations,
the optical base station that receives the optical ID transmits the received optical ID to the terminal using an optical signal, and
the wireless base station determined by the base station control device wirelessly communicates with the terminal that receives the optical ID.

4. A base station control device connected to one or more wireless base stations and one or more optical base stations,
wherein the base station control device
collects wireless base station information from each wireless base station,
determines a wireless base station that wirelessly communicates with a terminal using the collected wireless base station information,
transmits an optical ID corresponding to the determined wireless base station to at least one of the one or more optical base stations,
causes the optical base station to transmit the optical ID to the terminal using an optical signal, and
causes the determined wireless base station to wirelessly communicate with the terminal that receives the optical ID.

5. A base station control program for causing a computer to implement each functional unit provided in the base station control device according to claim 4.

* * * * *